(12) United States Patent
Shimotsu et al.

(10) Patent No.: US 10,473,883 B2
(45) Date of Patent: Nov. 12, 2019

(54) VARIABLE MAGNIFICATION OPTICAL SYSTEM AND CONTROL METHOD THEREOF

(71) Applicant: FUJIFILM Corporation, Tokyo (JP)

(72) Inventors: Shinichi Shimotsu, Saitama (JP); Yoshitaka Mori, Saitama (JP); Takayuki Matsuura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/131,060

(22) Filed: Sep. 14, 2018

(65) Prior Publication Data

US 2019/0011662 A1    Jan. 10, 2019

Related U.S. Application Data

(63) Continuation of application No. PCT/JP2016/083643, filed on Nov. 14, 2016.

(30) Foreign Application Priority Data

Mar. 16, 2016 (JP) .................................. 2016-052258

(51) Int. Cl.
*G02B 7/04* (2006.01)
*G03B 5/00* (2006.01)
(Continued)

(52) U.S. Cl.
CPC ............... *G02B 7/04* (2013.01); *G02B 7/005* (2013.01); *G02B 7/08* (2013.01); *G02B 7/10* (2013.01);
(Continued)

(58) Field of Classification Search
CPC ........ G02B 13/02; G02B 13/06; G02B 15/16; G02B 7/005; G02B 7/04; G02B 7/08;
(Continued)

(56) References Cited

U.S. PATENT DOCUMENTS

2008/0117326 A1* 5/2008 Nishio ................... G02B 13/06
                                                       348/360
2009/0290860 A1* 11/2009 Uchida .................. G02B 7/021
                                                       396/144
(Continued)

FOREIGN PATENT DOCUMENTS

JP       S6195308       5/1986
JP       H11242154      9/1999
(Continued)

OTHER PUBLICATIONS

"International Search Report (Form PCT/ISA/210) of PCT/JP2016/083643", dated Feb. 7, 2017, with English translation thereof, pp. 1-5.
(Continued)

*Primary Examiner* — Amy R Hsu
(74) *Attorney, Agent, or Firm* — JCIPRNET

(57) ABSTRACT

There are provided a variable magnification optical system and a control method thereof which are capable of relatively accurately adjusting a positional relationship between a variable magnification optical device and an imaging surface of an imaging device according to a zoom amount. A zoom lens included in the variable magnification optical device is positioned at a telephoto end and a wide angle end, and shift amounts $\Delta S1$ and $\Delta S2$, tilt angles $\theta 1$ and $\theta 2$, rotation angles $\phi 1$ and $\phi 2$, and focusing adjustment amounts $\Delta 1$ and $\Delta 2$ of the variable magnification optical device are set by a user and are stored. In a case where a zoom amount of the zoom lens is set to a desired value by the user, a shift amount corresponding to the set zoom amount is calculated by using the stored shift amounts $\Delta S1$ and $\Delta S2$. The positional relationship between the variable magnification optical device and the imaging surface of the imaging device is adjusted so as to have the calculated shift amount.

10 Claims, 15 Drawing Sheets

(51) Int. Cl.
*G02B 13/02* (2006.01)
*G02B 13/06* (2006.01)
*G03B 3/04* (2006.01)
*G03B 5/02* (2006.01)
*G02B 7/00* (2006.01)
*G02B 7/10* (2006.01)
*G02B 7/28* (2006.01)
*G02B 15/16* (2006.01)
*G02B 7/08* (2006.01)

(52) U.S. Cl.
CPC ............. *G02B 7/282* (2013.01); *G02B 13/02* (2013.01); *G02B 13/06* (2013.01); *G02B 15/16* (2013.01); *G03B 3/04* (2013.01); *G03B 5/00* (2013.01); *G03B 5/02* (2013.01)

(58) Field of Classification Search
CPC . G02B 7/10; G02B 7/282; G03B 3/04; G03B 5/00; G03B 5/02
See application file for complete search history.

(56) References Cited

U.S. PATENT DOCUMENTS

| | | | | |
|---|---|---|---|---|
| 2010/0315520 | A1* | 12/2010 | Noto | G03B 5/00 348/208.11 |
| 2011/0032615 | A1* | 2/2011 | Usui | G02B 27/646 359/554 |
| 2011/0226955 | A1* | 9/2011 | Luty | G02B 27/644 250/353 |
| 2013/0088791 | A1* | 4/2013 | Iwasaki | G02B 7/08 359/827 |
| 2013/0308933 | A1* | 11/2013 | Uchiyama | G03B 13/36 396/125 |
| 2014/0168503 | A1* | 6/2014 | Maruyama | H04N 5/23212 348/350 |
| 2015/0185494 | A1* | 7/2015 | Nanba | G02B 27/646 359/557 |

FOREIGN PATENT DOCUMENTS

| | | |
|---|---|---|
| JP | 2009225027 | 10/2009 |
| JP | 2010266574 | 11/2010 |
| JP | 2013242353 | 12/2013 |
| JP | 2014120923 | 6/2014 |
| JP | 2015099216 | 5/2015 |
| JP | 2015125246 | 7/2015 |
| JP | 2015194592 | 11/2015 |

OTHER PUBLICATIONS

"International Preliminary Report on Patentability (Form PCT/IPEA/409)", published on Jul. 13, 2017, with English translation thereof, pp. 1-16.

* cited by examiner

FIG. 13

|  | TELEPHOTO END | WIDE ANGLE END |
|---|---|---|
| SHIFT AMOUNT | $\Delta S1$ | $\Delta S2$ |
| TILT ANGLE | $\theta 1$ | $\theta 2$ |
| ROTATION ANGLE | $\phi 1$ | $\phi 2$ |
| FOCUSING ADJUSTMENT AMOUNT | $\Delta 1$ | $\Delta 2$ |

VARIABLE MAGNIFICATION OPTICAL SYSTEM AND CONTROL METHOD THEREOF

CROSS-REFERENCE TO RELATED APPLICATIONS

This application is a Continuation of PCT International Application No. PCT/JP2016/083643 filed on Nov. 14, 2016, which claims priority under 35 U.S.C. § 119(a) to Japanese Patent Application No. 2016-052258 filed on Mar. 16, 2016. Each of the above application(s) is hereby expressly incorporated by reference, in its entirety, into the present application.

BACKGROUND OF THE INVENTION

1. Field of the Invention

The invention relates to a variable magnification optical system and a control method thereof.

2. Description of the Related Art

In a case where a subject is captured by using a lens device, it is preferable that a stop is opened in order to obtain a subject image with high resolution. However, in a case where the stop is opened, a focal depth is shallow. In a case where the stop is narrowed (F number is increased), the focal depth becomes deep. However, as the resolution of the subject image deteriorates, the subject image becomes darker. In the lens device suitable for a 4K television, since the focal depth is shallow, the stop is narrowed in order to capture the subject, and thus, the focal depth becomes deep. Thus, the resolution of the subject deteriorates, and it is difficult to capture a dark scene. In a case where the subject and a camera do not face each other, only a part of the subject is captured with a shallow focal depth within the focal depth.

In a case where the subject and the camera do not face each other, the subject and the camera are caused so as to face each other by using the lens device having a tilt function (JP2010-266574A, JP1999-242154A (JP-H11-242154A), and JP1986-95308A (JP-S61-95308A)). An optical device having both an optical anti-vibration function and a tilt function is considered (JP2015-99216A). A lens unit that includes a zoom mechanism which moves a lens barrel in an optical axis direction and a lens shift mechanism which moves the lens barrel in a radial direction perpendicular to the optical axis direction through the rotation motion of the zoom mechanism is also considered (JP2015-194592A). A lens unit that performs a zoom operation and a shift operation in line with each other is also considered (JP2015-125246A).

SUMMARY OF THE INVENTION

In a case where the zoom lens has a function of adjusting a positional relationship between the lens and an imaging surface of an imaging device, such as the tilt function or the shift function, an adjustment amount is changed according to a zoom amount. Thus, it is necessary to adjust the positional relationship between the lens and the imaging surface of the imaging device with the adjustment amount corresponding to the zoom amount. All the technologies described in JP2010-266574A, JP1999-242154A (JP-H11-242154A), and JP2015-99216A do not consider the zoom lens. The technology described in JP1986-95308A (JP-S61-95308A) relates to the zoom lens including the tilt mechanism. However, since tilt correction is performed according to zooming from one initial set value, the accuracy of the tilt correction is not accurate. In the technology described in JP2015-194592A, since a shift direction is restricted to one direction (Y direction) perpendicular to an optical axis, the lens unit is not able to be shifted in other directions. In the technology described in JP2015-125246A, a lens group composing the zoom lens is defined as a shift anti-vibration group and a tilt anti-vibration group, and thus, the positional relationship between the zoom lens and the imaging surface of the imaging device is not adjusted.

An object of the invention is to relatively accurately adjust a positional relationship between a variable magnification optical device and an imaging surface of an imaging device according to a variable magnification amount.

A variable magnification optical system according to the invention comprises a variable magnification optical device that forms a subject image on an imaging surface of an imaging device by changing a magnification of the subject image according to a variable magnification amount, a variable magnification amount setting device that sets a variable magnification amount of the variable magnification optical device, a position adjustment mechanism that adjusts a positional relationship between the variable magnification optical device and the imaging surface, a position adjustment amount memory that stores position adjustment amounts using the position adjustment mechanism which correspond to at least two kinds of variable magnification amounts, a position adjustment amount calculating unit that calculates a position adjustment amount using the position adjustment mechanism which corresponds to the variable magnification amount set by the variable magnification amount setting device by using the position adjustment amounts stored in the position adjustment amount memory, and a position adjustment mechanism controller that causes the position adjustment mechanism to adjust the positional relationship between the variable magnification optical device and the imaging surface by using the position adjustment amount calculated by the position adjustment amount calculating unit.

The invention provides a control method suitable for the variable magnification optical system. That is, the control method comprises causing a variable magnification optical device to form a subject image on an imaging surface of an imaging device by changing a magnification of the subject image according to a variable magnification amount, causing a variable magnification amount setting device to set a variable magnification amount of the variable magnification optical device, causing a position adjustment mechanism to adjust a positional relationship between the variable magnification optical device and the imaging surface, causing a position adjustment amount memory to store position adjustment amounts using the position adjustment mechanism which correspond to at least two kinds of variable magnification amounts, causing a position adjustment amount calculating unit to calculate a position adjustment amount using the position adjustment mechanism which corresponds to the variable magnification amount set by the variable magnification amount setting device by using the position adjustment amounts stored in the position adjustment amount memory, and causing a position adjustment mechanism controller to cause the position adjustment mechanism to adjust the positional relationship between the variable magnification optical device and the imaging surface by using the position adjustment amount calculated by the position adjustment amount calculating unit.

The variable magnification optical system may further comprise a magnifying optical system that magnifies the subject image formed on the imaging surface of the imaging device.

The variable magnification optical system may further comprise a determination unit that determines whether or not at least a part of the imaging surface is not included in a range of the subject image magnified by the magnifying optical system in a case where the positional relationship between the variable magnification optical device and the imaging surface is adjusted by the position adjustment mechanism by using the position adjustment amount calculated by the position adjustment amount calculating unit, and a position adjustment amount correcting unit that corrects the position adjustment amount calculated by the position adjustment amount calculating unit to a position adjustment amount with which the imaging surface is included in the range of the subject image magnified by the magnifying optical system in a case where adjustment using the position adjustment mechanism is performed according to the fact that the determination unit determines that the at least a part of the imaging surface is not included in the range of the subject image magnified by the magnifying optical system.

The variable magnification optical system may further comprise a position adjustment amount input unit that inputs the position adjustment amounts using the position adjustment mechanism which correspond to the at least two kinds of variable magnification amounts. In this case, the position adjustment amount memory stores, for example, the position adjustment amounts input from the position adjustment amount input unit.

The variable magnification optical system may further comprise a focusing adjustment mechanism that forms the subject image on the imaging surface by adjusting a focusing adjustment amount, a focusing adjustment amount memory that stores focusing adjustment amounts using the focusing adjustment mechanism which correspond to the at least two kinds of variable magnification amounts, a focusing adjustment amount calculating unit that calculates the focusing adjustment amount using the focusing adjustment mechanism which corresponds to the variable magnification amount set by the variable magnification amount setting device by using the focusing adjustment amounts stored in the focusing adjustment amount memory, and a focusing adjustment mechanism controller that forms the subject image on the imaging surface by the focusing adjustment mechanism by using the focusing adjustment amount calculated by the focusing adjustment amount calculating unit.

For example, the variable magnification optical device includes at least one optical system of a focusing optical system or a master optical system. For example, the focusing adjustment mechanism forms the subject image on the imaging surface by adjusting the at least one optical system of the focusing optical system or the master optical system.

For example, the position adjustment mechanism is at least one of a tilt mechanism that relatively tilts an optical axis of the variable magnification optical device to a central axis of the imaging surface, a shift mechanism that relatively slides the variable magnification optical device with respect to the imaging surface, or a rotation mechanism that relatively rotates the variable magnification optical device around the imaging surface with the optical axis of the variable magnification optical device or the central axis of the imaging surface as a center.

For example, the at least two kinds of variable magnification amounts are a variable magnification amount at a telephoto end and a variable magnification amount (including 1× magnification) at a wide angle end.

For example, the position adjustment amount calculating unit calculates the position adjustment amount using the position adjustment mechanism which corresponds to the variable magnification amount set by the variable magnification amount setting device by performing linear interpolation on the position adjustment amounts using the position adjustment mechanism which correspond to the at least two kinds of variable magnification amounts stored in the position adjustment amount memory.

For example, the focusing adjustment amount calculating unit calculates the focusing adjustment amount using the focusing adjustment mechanism which corresponds to the variable magnification amount set by the variable magnification amount setting device by performing linear interpolation on the focusing adjustment amounts using the focusing adjustment mechanism which correspond to the at least two kinds of variable magnification amounts stored in the focusing adjustment amount memory.

The variable magnification optical system may further comprise a focusing adjustment amount input unit that inputs the focusing adjustment amounts using the focusing adjustment mechanism which correspond to the at least two kinds of variable magnification amounts. In this case, the focusing adjustment amount memory stores, for example, the focusing adjustment amounts input from the focusing adjustment amount input unit.

The imaging device is provided on a camera main body, and at least one of the variable magnification amount setting device, the position adjustment mechanism, the position adjustment amount memory, the position adjustment amount calculating unit, or the position adjustment mechanism controller is further provided on the camera main body.

According to the invention, the position adjustment amounts corresponding to the at least two kinds of variable magnification amounts are stored. In a case where the variable magnification amount is set by the variable magnification amount setting device, the position adjustment amount corresponding to the set variable magnification amount is calculated by using the at least two kinds of stored position adjustment amounts. The positional relationship between the variable magnification optical device and the imaging surface is adjusted by using the calculated position adjustment amount. Since the position adjustment amount corresponding to the set variable magnification amount is calculated by using the position adjustment amounts corresponding to the at least two kinds of variable magnification amounts, it is possible to calculate a relatively accurate position adjustment amount. It is possible to relatively accurately adjust the positional relationship between the variable magnification optical device and the imaging surface of the imaging device according to the variable magnification amount.

BRIEF DESCRIPTION OF THE DRAWINGS

FIG. 13 is an example of a position adjustment amount table.

DESCRIPTION OF THE PREFERRED EMBODIMENTS

Figure 1:
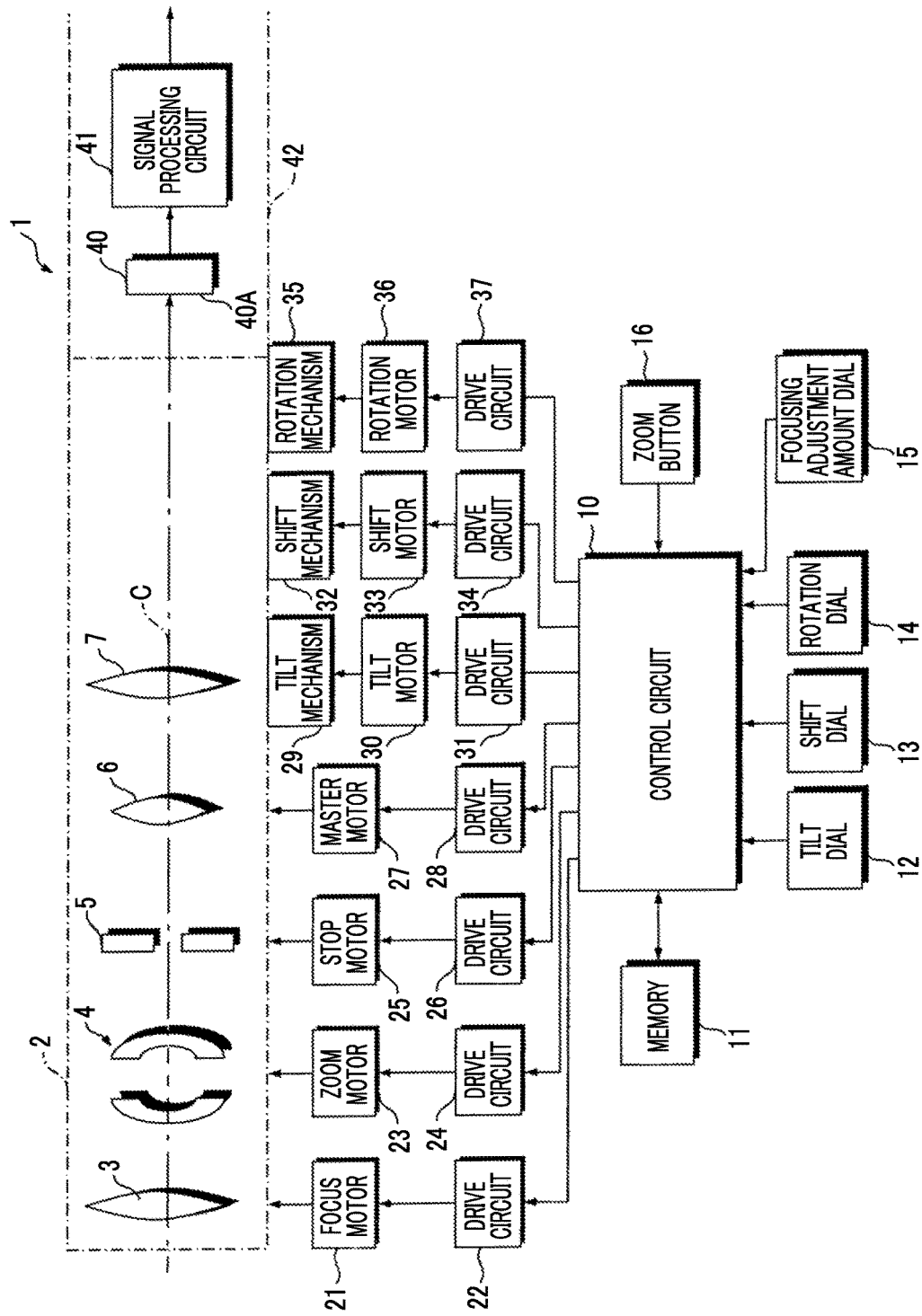
FIG. 1 is a block diagram showing an electric configuration of a variable magnification optical system.

FIG. 1 shows an embodiment of the invention, and is a block diagram showing an electric configuration of a variable magnification optical system 1.

The variable magnification optical system 1 according to the embodiment includes a position adjustment mechanism that adjusts a positional relationship (a positional relationship between an image created by the variable magnification optical device 2 and the imaging surface 40A) between a variable magnification optical device 2 and an imaging surface 40A of an imaging device 40. The variable magnification optical system 1 includes a tilt mechanism 29, a shift mechanism 32, and a rotation mechanism 35, as the position adjustment mechanism. Although it has been described in this embodiment that all the tilt mechanism 29, the shift mechanism 32, and the rotation mechanism 35, are provided in the variable magnification optical system 1, at least one mechanism of the tilt mechanism 29, the shift mechanism 32, or the rotation mechanism 35 may be provided as the position adjustment mechanism in the variable magnification optical system 1. The tilt mechanism 29 relatively tilts an optical axis C of the variable magnification optical device 2 to a central axis of the imaging surface 40A of the imaging device 40. The tilt mechanism may tilt the variable magnification optical device 2, may tilt the imaging device 40, or may tilt the variable magnification optical device 2 and the imaging device 40. The shift mechanism 32 relatively slides the variable magnification optical device 2 to the imaging surface 40A of the imaging device 40. The tilt mechanism may slide the variable magnification optical device 2, may slide the imaging device 40, or may slide both the variable magnification optical device 2 and the imaging device 40. The rotation mechanism 35 relatively rotates the variable magnification optical device 2 around the imaging surface 40A with the optical axis C of the variable magnification optical device 2 or the central axis of the imaging surface 40A of the imaging device 40 as a center. The rotation mechanism may rotate the variable magnification optical device 2, may rotate the imaging device 40, or may rotate both the variable magnification optical device 2 and the imaging device 40. The known mechanisms may be used as the tilt mechanism 29, the shift mechanism 32, and the rotation mechanism 35.

The overall operation of the variable magnification optical system 1 may be supervised by a control circuit 10.

A memory 11 (a position adjustment amount memory) that stores predetermined data is connected to the control circuit 10. Specifically, position adjustment amounts using the position adjustment mechanism which correspond to at least two kinds of variable magnification amounts are stored in the memory 11, as will be described below.

A tilt dial 12, a shift dial 13, a rotation dial 14, a focusing adjustment amount dial 15, and a zoom button 16 are provided in the variable magnification optical system 1. The tilt dial 12 sets a tilt angle (Dutch angle) using the tilt mechanism 29. A signal indicating the set tilt angle is input to the control circuit 10. The shift dial 13 sets a shift amount using the shift mechanism 32. A signal indicating the set shift amount is input to the control circuit 10. The rotation dial 14 sets a rotation amount using the rotation mechanism 35. A signal indicating the set rotation amount is input to the control circuit 10. The focusing adjustment amount dial 15 sets a focusing adjustment amount. A signal indicating the set focusing adjustment amount is input to the control circuit 10. In a case where the focusing adjustment amount is relatively large, focusing is adjusted by using the focus lens 3 (focus optical system) included in the variable magnification optical device 2. In a case where the focusing adjustment amount is relatively small, focusing is adjusted by using a master lens 6 (master optical system) included in the variable magnification optical device 2. The zoom button 16 sets a variable magnification amount of the variable magnification optical device 2. A signal indicating the set variable magnification amount is also input to the control circuit 10.

The variable magnification optical device 2 is included in the variable magnification optical system 1. A subject image of which a magnification is changed according to the variable magnification amount is formed on the imaging surface 40A of the imaging device 40 by the variable magnification optical device 2.

The focus lens 3, a zoom lens 4, a stop 5, the master lens 6, and a magnifying lens 7 are included in the variable magnification optical device 2. Although it is illustrated in FIG. 1 that each of the focus lens 3, the master lens 6, and the magnifying lens 7 is composed of one lens, each lens may be constructed by one lens or may be composed of a lens group including a plurality of lenses. Although it is illustrated in FIG. 1 that the zoom lens 4 is composed of two lenses, the zoom lens may be composed of three or more lenses. The zoom lens 4 is typically composed of three or more lenses.

The focus lens 3 is positioned in an optical axis direction by a focus motor 21. The focus motor 21 is driven by a drive circuit 22 controlled by the control circuit 10. A zoom position (positions of the lenses composing the zoom lens 4) of the zoom lens 4 is positioned by a zoom motor 23. The zoom motor 23 is driven by a drive circuit 24 controlled by the control circuit 10. An opening amount of the stop 5 is determined by a stop motor 25. The stop motor 25 is driven by a drive circuit 26 controlled by the control circuit 10. In a case where an F number is set by a stop setting button (not shown), a signal indicating the set F number is input to the control circuit 10, and the stop motor 25 is driven by the drive circuit 26 such that the F number becomes the set F number. The master lens 6 is positioned in the optical axis direction by the master motor 27. The master motor 27 is driven by a drive circuit 28 controlled by the control circuit 10. In a case where the focusing adjustment amount is relatively large as stated above, the focus lens 3 is positioned by the focus motor 21 such that focusing is adjusted by using the focus lens 3. In a case where the focusing adjustment amount is relatively small, the master lens 6 is positioned by the master motor 27 such that the focusing is adjusted by the master lens 6.

The magnifying lens 7 is included in the variable magnification optical device 2 according to the embodiment. The magnifying lens 7 is a magnifying optical system that magnifies the subject image formed on the imaging surface 40A of the imaging device 40. The magnifying lens 7 is different from the zoom lens 4 in that the zoom lens 4 changes a magnification of the subject image according to the variable magnification amount but the magnifying lens 7 magnifies the subject image. In a case where an extender lens is provided in the variable magnification optical device 2, the magnifying lens 7 is provided separately from the extender lens. In regard to this point, the magnifying lens 7 is also different from the extender lens. The magnifying lens 7 may not be necessarily included in the variable magnification optical device 2.

The tilt mechanism 29 is operated by a tilt motor 30. The tilt motor 30 is driven by a drive circuit 31 controlled by the control circuit 10. The tilt mechanism 29 is operated by the tilt motor 30 so as to have the tilt angle set by the tilt dial 12.

The shift mechanism 32 is operated by a shift motor 33. The shift motor 33 is driven by a drive circuit 34 controlled by the control circuit 10. The shift mechanism 32 is operated by the shift motor 33 so as to have the shift amount set by the shift dial 13.

The rotation mechanism 35 is operated by a rotation motor 36. The rotation motor 36 is driven by a drive circuit 37 controlled by the control circuit 10. The rotation mechanism 35 is operated by the rotation motor 36 so as to have the rotation amount set by the rotation dial 14.

At least one mechanism of the tilt mechanism 29, the shift mechanism 32, or the rotation mechanism 35 is the position adjustment mechanism that adjusts a positional relationship between the variable magnification optical device 2 and the imaging surface 40A of the imaging device 40.

The subject image is formed on the imaging surface 40A of the imaging device 40 provided at the camera main body 42 by the variable magnification optical device 2. Video signals representing the subject image are output from the imaging device 40, and are input to a signal processing circuit 41. Predetermined signal processing is performed by the signal processing circuit 41. Output data items from the signal processing circuit 41 are supplied to a display device (not shown). At least one of the zoom button 16 (variable magnification amount setting device), the memory 11 (position adjustment amount memory), the tilt mechanism 29, the shift mechanism 32, and the rotation mechanism 35 (position adjustment mechanism), or the control circuit 10 (position adjustment amount calculating unit or position adjustment mechanism controller) may be provided at the camera main body 42.

Figure 2:
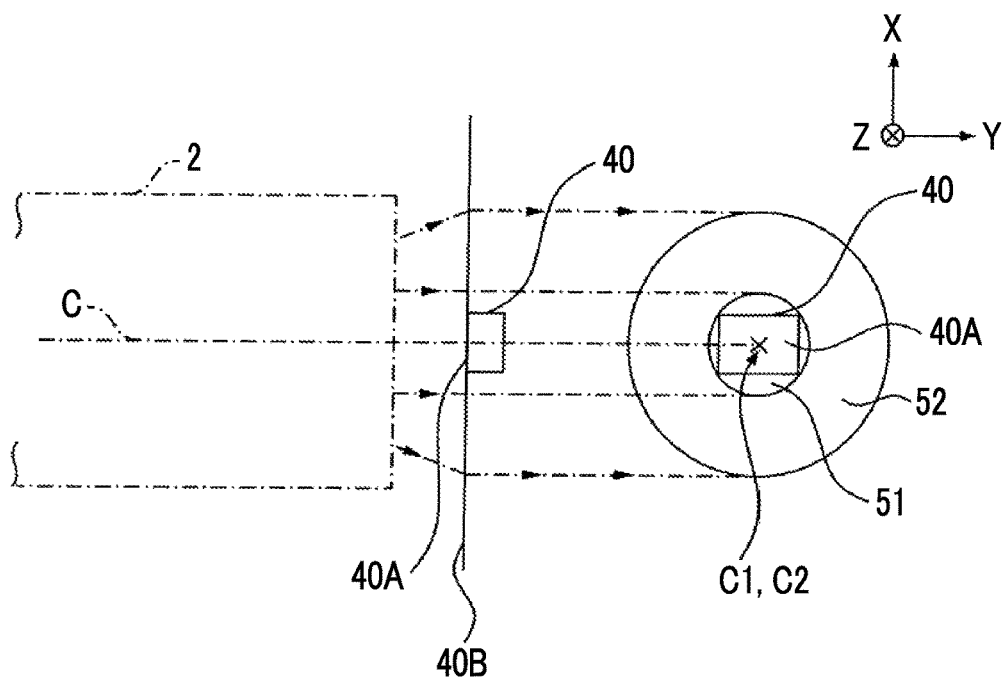
FIG. 2 shows the relationship between a variable magnification optical device and an imaging surface of an imaging device.

FIG. 2 shows the relationship between circles 51 and 52 representing the subject image formed by the variable magnification optical device 2 and the imaging surface 40A of the imaging device 40.

The subject image is formed by the variable magnification optical device 2. In a case where the magnifying lens 7 is not included in the variable magnification optical device 2, the subject image formed by the variable magnification optical device 2 is represented by the circle 51. In a state in which the variable magnification optical device 2 is neither shifted nor tilted, the circle 51 representing the subject image is circumscribed about the imaging surface 40A of the imaging device 40. In a case where the circle 51 is circumscribed about the imaging surface 40A of the imaging device 40 and a length of a diagonal line of the imaging surface 40A of the imaging device 40 is L, a diameter of the circle 51 is L. The circle 51 may not be necessarily circumscribed about the imaging surface 40A of the imaging device 40. At least the imaging surface 40A of the imaging device 40 is completely included in the circle 51 representing the subject image, and does not protrude from the circle 51.

In a case where the magnifying lens 7 is included in the variable magnification optical device 2, since the subject image is magnified by the variable magnification optical device 2, the subject image formed by the variable magnification optical device 2 is formed on the same surface 40B as the imaging surface 40A of the imaging device 40, and is represented by the circle 52. In a case where the magnification of the magnifying lens 7 is m, a diameter of the circle 52 satisfies L×m.

In this embodiment, the variable magnification optical device 2 is relatively shifted (slide) with respect to the imaging device 40, and thus, it is possible to adjust the positional relationship between the variable magnification optical device 2 and the imaging surface 40A of the imaging device 40. The variable magnification optical device 2 may be shifted with respect to the imaging device 40, or the imaging device 40 may be shifted with respect to the variable magnification optical device 2. In a case where an XY plane with the optical axis C of the variable magnification optical device 2 as a normal of a Z axis and axes perpendicular to each other with the Z axis as a starting point are an X axis and a Y axis, at least one of the variable magnification optical device 2 or the imaging device 40 is shifted in at least one direction of an X direction or a Y direction. In a case where both the variable magnification optical device 2 and the imaging device 40 are not shifted, a position of a center C1 of the circle 51 representing the subject image which is not magnified by the magnifying lens 7 and a position of a center C2 of the circle 52 representing the subject image which is magnified by the magnifying lens 7 match a position of a center of the imaging surface 40A of the imaging device 40.

The variable magnification optical device 2 and the imaging device 40 are relatively shifted in a range in which the circle 51 does not protrude from the circle 52. In a case where the circle 51 does not protrude from the circle 52, even though the imaging device 40 is rotated, the imaging surface 40A of the imaging device 40 does not protrude from the circle 52. Since the circle 52 represents the magnified subject image, in a case where the imaging surface 40A protrudes from the circle 52 and the imaging device 40 is rotated, a portion which is not irradiated with light is generated on the imaging surface 40A, and thus, a black portion is formed on an image represented by the video signals output from the imaging device 40. Since the circle 52 represents the subject image magnified by the magnifying lens 7, in a case where the imaging surface 40A does not protrude from the circle 52, a part of the subject image is formed on the imaging surface 40A of the imaging device 40, and thus, the portion which is not irradiated with light is not generated on the imaging surface 40A. The black portion is prevented from being generated on the image represented by the video signals output from the imaging device 40 in advance.

Figure 3:
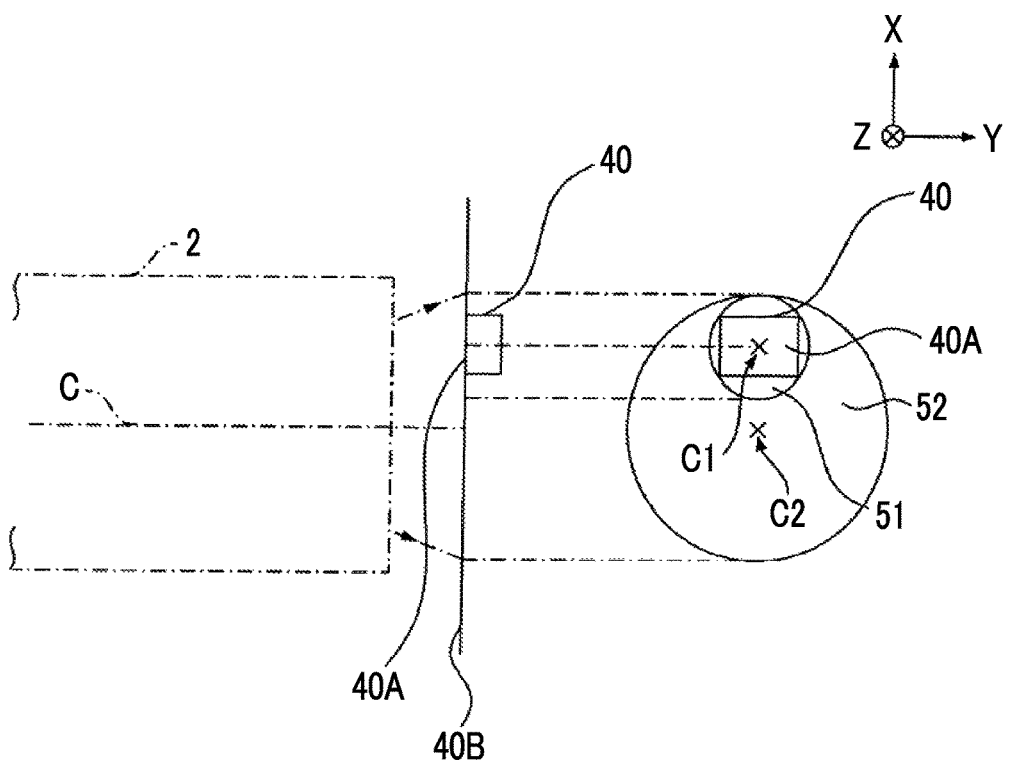
FIG. 3 shows the relationship between the variable magnification optical device and the imaging surface of the imaging device.
Figure 4:
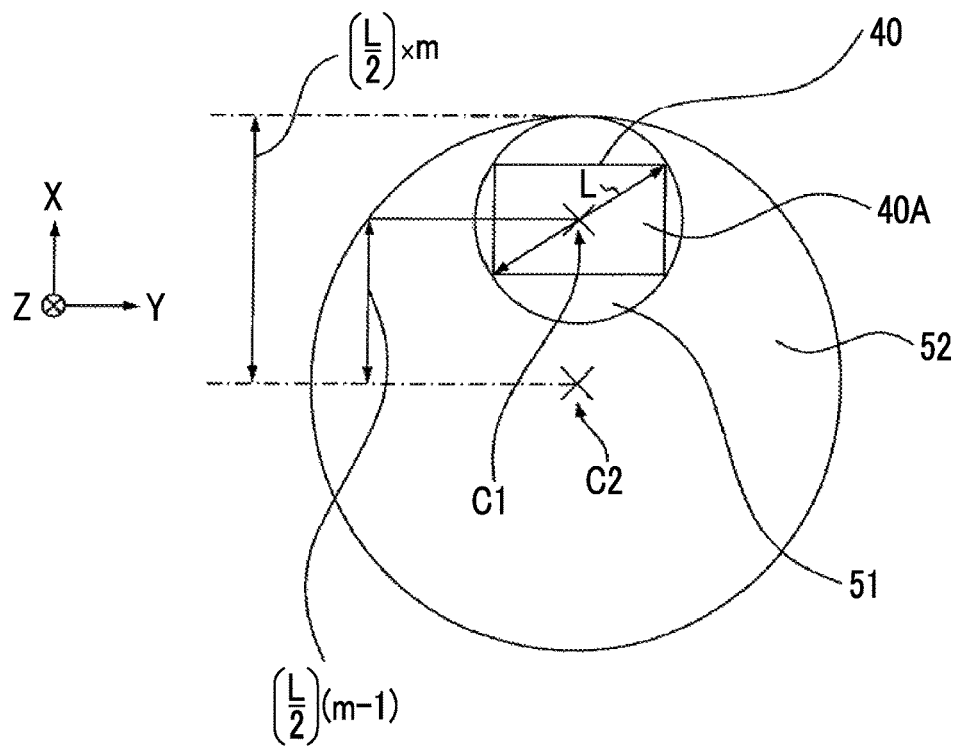
FIG. 4 shows the relationship between a circle representing a magnified subject image and the imaging surface of the imaging device.

FIG. 3 shows an example in which the variable magnification optical device 2 is shifted in a −X direction (example in which the imaging device 40 is shifted in the X direction), and FIG. 4 is an enlarged view obtained by further magnifying the circle 51, the circle 52, and the imaging surface 40A compared to FIG. 3.

In a case where the length of the diagonal line of the imaging surface 40A of the imaging device 40 is L and the magnification of the magnifying lens 7 included in the variable magnification optical device 2 is m, a radius of the circle 52 satisfies (L/2)×m. Since a radius of the circle 51 is L/2, the maximum shift amount with which the circle 51 does not protrude from the circle 52 satisfies (L/2)×m−L/2=(L/2)×(m−1). The variable magnification optical device 2 and the imaging device 40 are relatively shifted in a range of ±(L/2)×(m−1).

In a case where the variable magnification optical device 2 and the imaging device 40 are not relatively rotated, the imaging surface 40A may not protrude from the circle 52.

Figure 5:
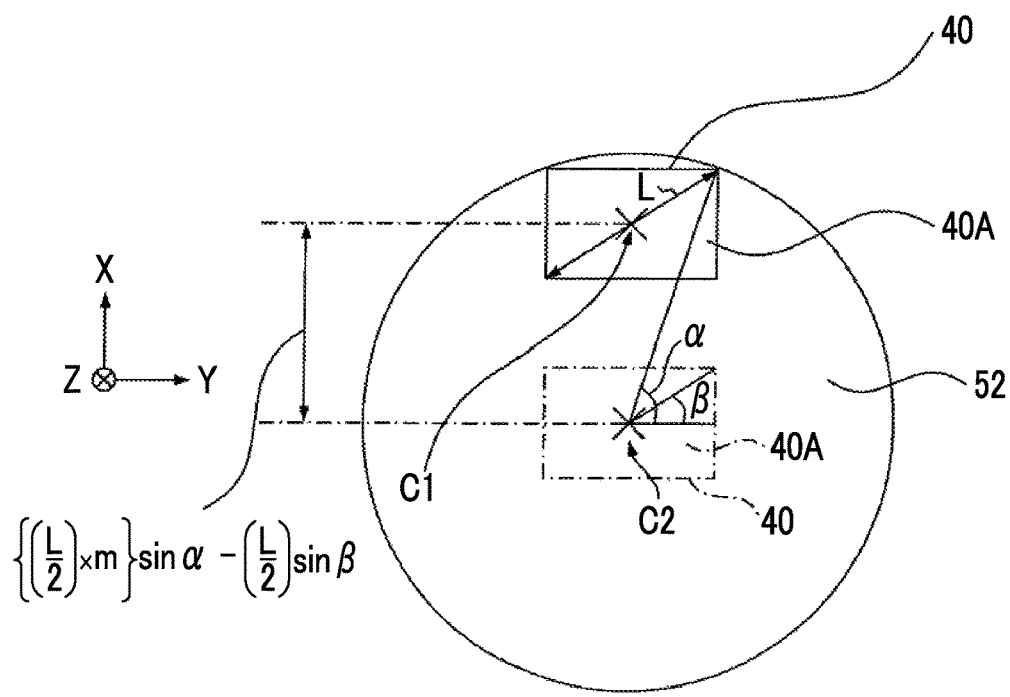
FIG. 5 shows the relationship between the circle representing the magnified subject image and the imaging surface of the imaging device.

FIG. 5 shows an example in which the positional relationship between the circle 52 and the imaging surface 40A is enlarged compared to FIG. 3.

In a case where the variable magnification optical device 2 and the imaging device 40 are relatively shifted in the X direction, a state in which two vertex angles of the imaging surface 40A are in contact with the circle 52 is the maximum shift amount. As shown in FIG. 5, in a case where an angle formed by a line that connects the center C2 of the circle 52 and the vertex angles of the imaging surface 40A in contact with the circle 52 and a line passing through the center C2 in the Y direction is α and an angle formed by the center of the imaging surface 40A and the vertex angles on the imaging surface 40A and a line passing through the imaging surface 40A in the Y direction is β, the maximum shift amount in the X direction is obtained by {(L/2)×m} sin α−(L/2) sin β. Since the angles α and β are uniquely determined by the radius {(L/2)×m} of the circle 52 or the dimension of the imaging surface 40A, the maximum shift amount in the X direction is uniquely determined. Similarly, it is possible to easily understand that the maximum shift amount in the Y direction is uniquely determined.

Figure 6:
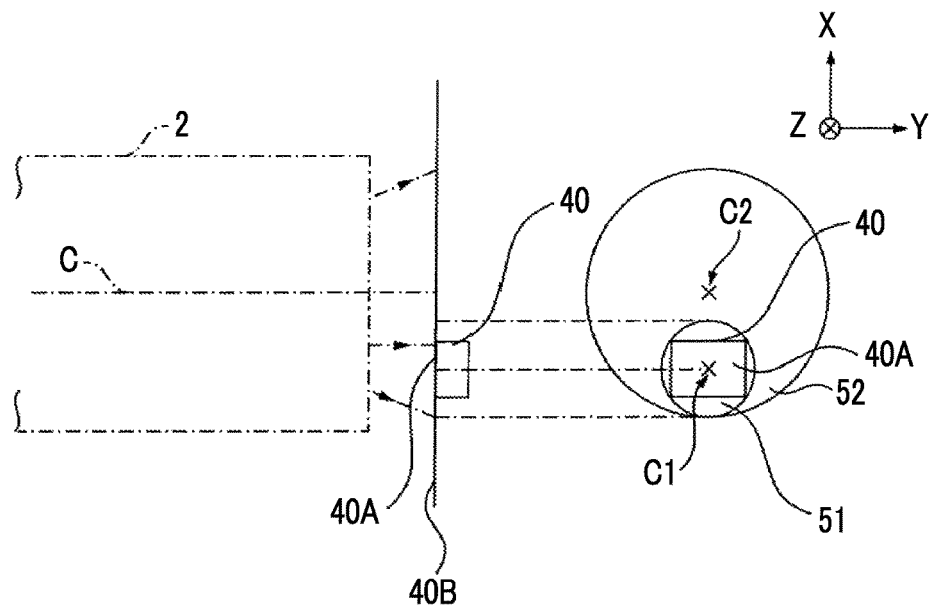
FIG. 6 shows the relationship between the variable magnification optical device and the imaging surface of the imaging device.

FIG. 6 corresponds to FIG. 3, and shows an example in which the variable magnification optical device 2 is shifted in the X direction (an example in which the imaging device 40 is shifted in the X direction).

Similarly the case where the variable magnification optical device 2 is shifted in the X direction (the imaging device 40 is shifted in the −X direction), the maximum shift amount with which the circle 51 does not protrude from the circle 52 satisfies (L/2)×m−L/2=(L/2)×(m−1) in the −X direction in a case where the variable magnification optical device 2 is shifted in the X direction (the imaging device 40 is shifted in the −X direction). The variable magnification optical device 2 and the imaging device 40 are relatively shifted in the −X direction in a range of (L/2)×(m−1).

As shown in FIG. 6, in a case where the variable magnification optical device 2 is shifted in the X direction (the imaging device 40 is shifted in the −X direction), the variable magnification optical device 2 may be shifted in the X direction (the imaging device 40 is shifted in the −X direction) such that not the circle 51 but the imaging surface 40A does not protrude from the circle 52 as shown in FIG. 5.

Figure 7:
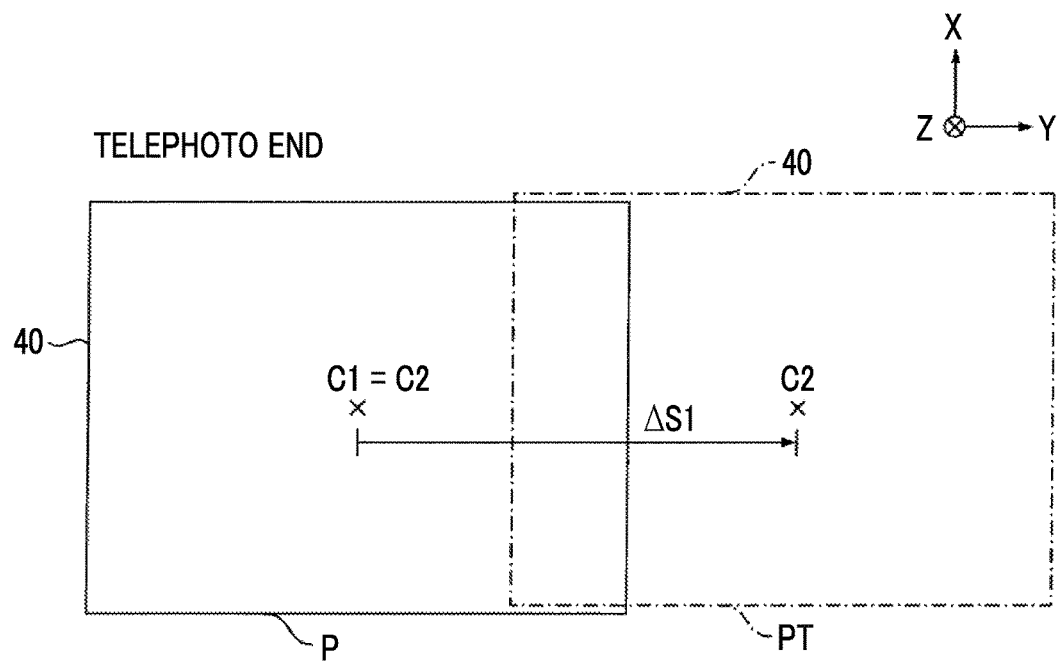
FIG. 7 shows an example in which the imaging device is relatively shifted in a case where a zoom lens is set at a telephoto end.
Figure 8:
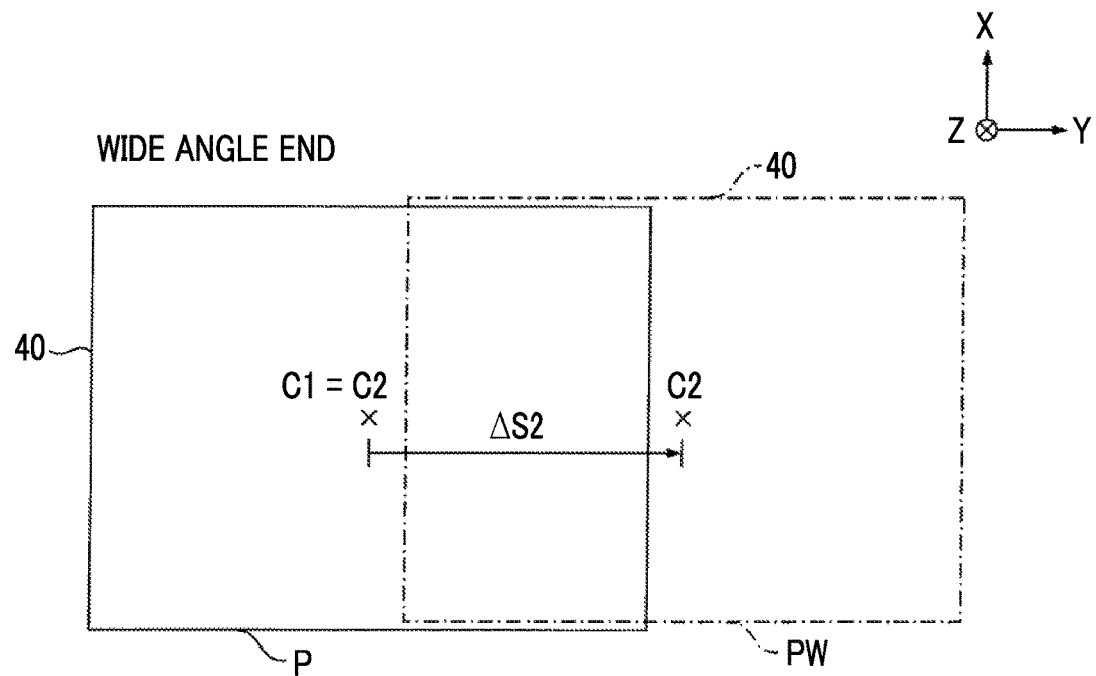
FIG. 8 shows an example in which the imaging device is relatively shifted in a case where the zoom lens is set at a wide angle end.

FIGS. 7 and 8 show examples in which the variable magnification optical device 2 is shifted in a −Y direction (the imaging device 40 is shifted in the Y direction).

FIG. 7 shows an example in which the zoom lens 4 is positioned at a telephoto end.

A position of the imaging device 40 in a case where the center of the imaging device 40, the center C1 of the circle 51, and the center C2 of the circle 52 match each other as shown in FIG. 2 is illustrated by a position P. A position of the zoom lens 4 is a reference position. In a case where the zoom lens 4 is positioned at the telephoto end, a user shifts the variable magnification optical device 2 in a desired position by operating the shift dial 12 while imaging the subject (or shifts the imaging device 40). In the example shown in FIG. 7, the imaging device 40 is relatively shifted in the Y direction by ΔS1. The shift position at the telephoto end is determined.

FIG. 8 shows an example in which the zoom lens 4 is positioned at a wide angle end.

In the case shown in FIG. 8, the position of the imaging device 40 in a case where the center of the imaging device 40, the center C1 of the circle 51, and the center C2 of the circle 52 match each other is illustrated by a position P. The position of the zoom lens 4 is a reference position. In a case where the zoom lens 4 is positioned at the wide angle end, the user shifts the variable magnification optical device 2 in a desired position by operating the shift dial 12 while imaging the subject (or shifts the imaging device 40). In the example shown in FIG. 8, the imaging device 40 is relatively shifted in the Y direction by ΔS2. The shift position at the telephoto end is determined.

In this embodiment, in a case where a zoom amount is set by using the zoom lens 4 and the subject is captured, a shift amount corresponding to the set zoom amount is calculated by using the set zoom amount the shift amounts set so as to correspond to the telephoto end and the wide angle end. The variable magnification optical device 2 and the imaging device 40 are relatively shifted so as to have the calculated shift amount.

Figure 9:
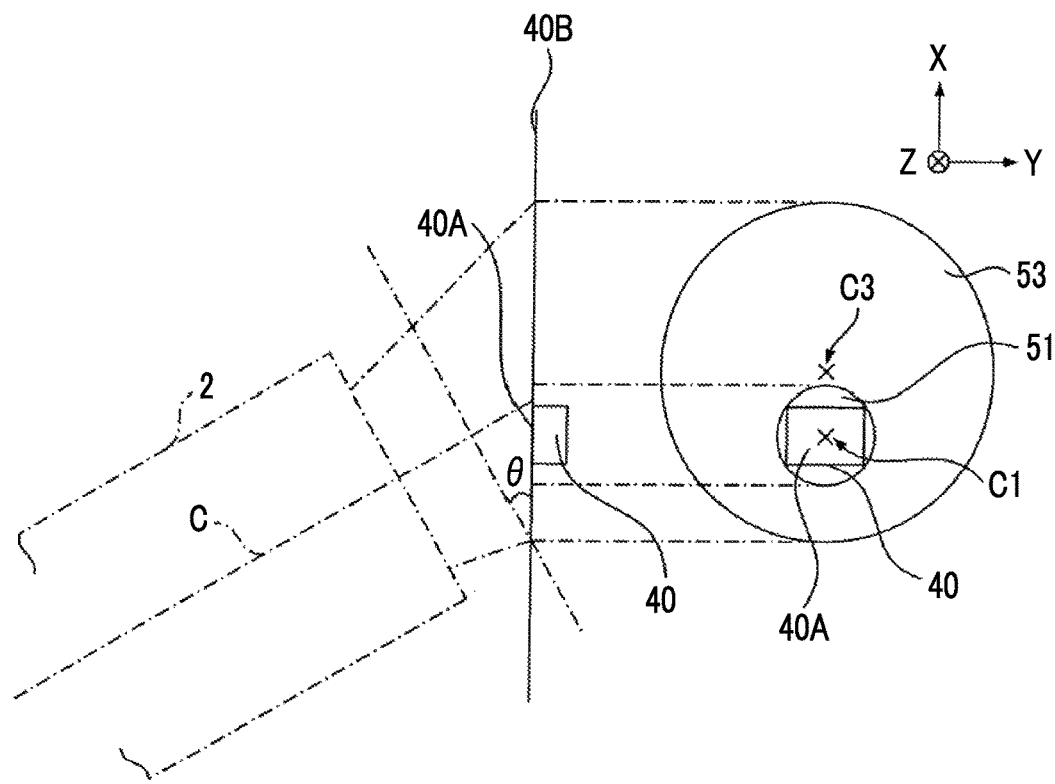
FIG. 9 shows the relationship between the variable magnification optical device and the imaging surface of the imaging device.

FIG. 9 shows the relationship between circles 51 and 53 representing the subject image formed by the variable magnification optical device 2 and the imaging surface 40A of the imaging device 40. The circle 53 represents a magnified subject image generated by tilting the variable magnification optical device 2 such that the optical axis C of the variable magnification optical device 2 is relatively tilted to the central axis of the imaging device 40.

In FIG. 9, the variable magnification optical device 2 is relatively tilted by a tilt angle θ such that the optical axis C of the variable magnification optical device 2 is relatively tilted to the central axis of the imaging device 40 by the tilt mechanism 29.

In a case where the variable magnification optical device 2 is relatively tilted such that the optical axis C of the variable magnification optical device 2 is relatively tilted to the central axis of the imaging device 40, the tilt angle at the telephoto end and the tilt angle at the wide angle end are obtained by the setting of the user, as described while referring to FIGS. 7 and 8. The tilt angle corresponding to the zoom amount set by the user is calculated from the tilt angle at the telephoto end and the tilt angle at the wide angle end, and is set by the tilt mechanism 29 so as to be the calculated tilt angle.

The shift amount is determined such that the optical axis C of the variable magnification optical device 2 is relatively tilted to the central axis of the imaging device 40 by the tilt mechanism 29 and the circle 51 or the imaging surface 40A does not protrude from the circle 53 as described while referring to FIGS. 2 to 6 even in a case where the variable magnification optical device 2 is tilted.

The tilt angle θ is an angle formed by the same surface 40B as the imaging surface 40A of the imaging device 40 and a plane with the optical axis C of the variable magnification optical device 2 as a normal. Since the dimension of the circle 53 is changed according to the dimension of the tilt angle θ, a range of the circle 53 obtained in a case where the variable magnification optical device 2 is relatively tilted to the imaging device 40 by the tilt angle θ is determined in advance so as to correspond to the tilt angle θ. Data indicating the range of the circle 53 is stored in advance in the memory 11 so as to correspond to the tilt angle θ. In a case where the variable magnification optical device 2 is relatively tilted by the tilt angle θ and the variable magnification optical device 2 is relatively shifted to the imaging device 40, the variable magnification optical device 2 is controlled by the control circuit 10 such that the variable magnification optical device 2 is able to be shifted in a range in which the circle 51 does not protrude from the range of the circle 53 defined by the data stored in advance in the memory 11. The variable magnification optical device 2 may be shifted in any direction of the X direction and the Y direction or may be shifted in any direction on a plane defined in the X direction and the Y direction. Even in a case where the variable magnification optical device 2 is relatively tilted to the imaging surface 40A of the imaging device 40, the variable magnification optical device 2 may be rotated around the optical axis C of the variable magnification optical device 2 by the rotation mechanism 35 (the imaging device 40 may be rotated around the central axis of the imaging surface 40A). In a case where the circle 51 is included in the circle 53, even though the variable magnification optical device 2 or the imaging device 40 is rotated, since the imaging surface 40A of the imaging device 40 does not protrude from the circle 53, a part of the subject image is constantly formed on the imaging surface 40A. The portion which is not irradiated with light is generated on the imaging surface 40A, and thus, the black portion is prevented from being generated on the image represented by the video signals output from the imaging device 40 in advance.

It has been described in the example shown in FIG. 9 that the variable magnification optical device is shifted such that the circle 51 does not protrude from the circle 53 (may not be necessarily shifted) in a case where the variable magnification optical device 2 is relatively tilted to the imaging device 40. In a case where the variable magnification optical device 2 and the imaging device 40 are not rotated, the variable magnification optical device may be shifted such that the imaging surface 40A of the imaging device 40 does not protrude from the circle 53 as described while referring to FIG. 5.

Figure 10:
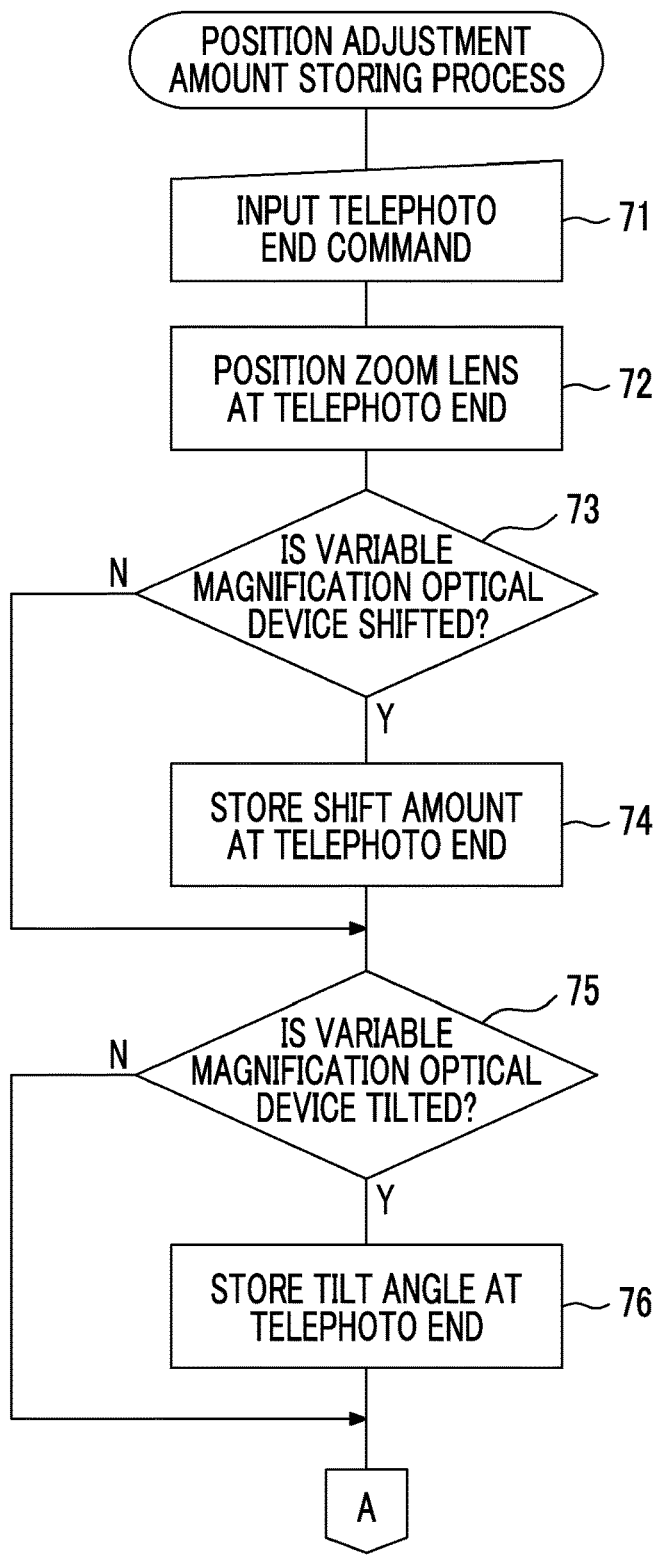
FIG. 10 is a flowchart showing a position adjustment amount storing process procedure.
Figure 11:
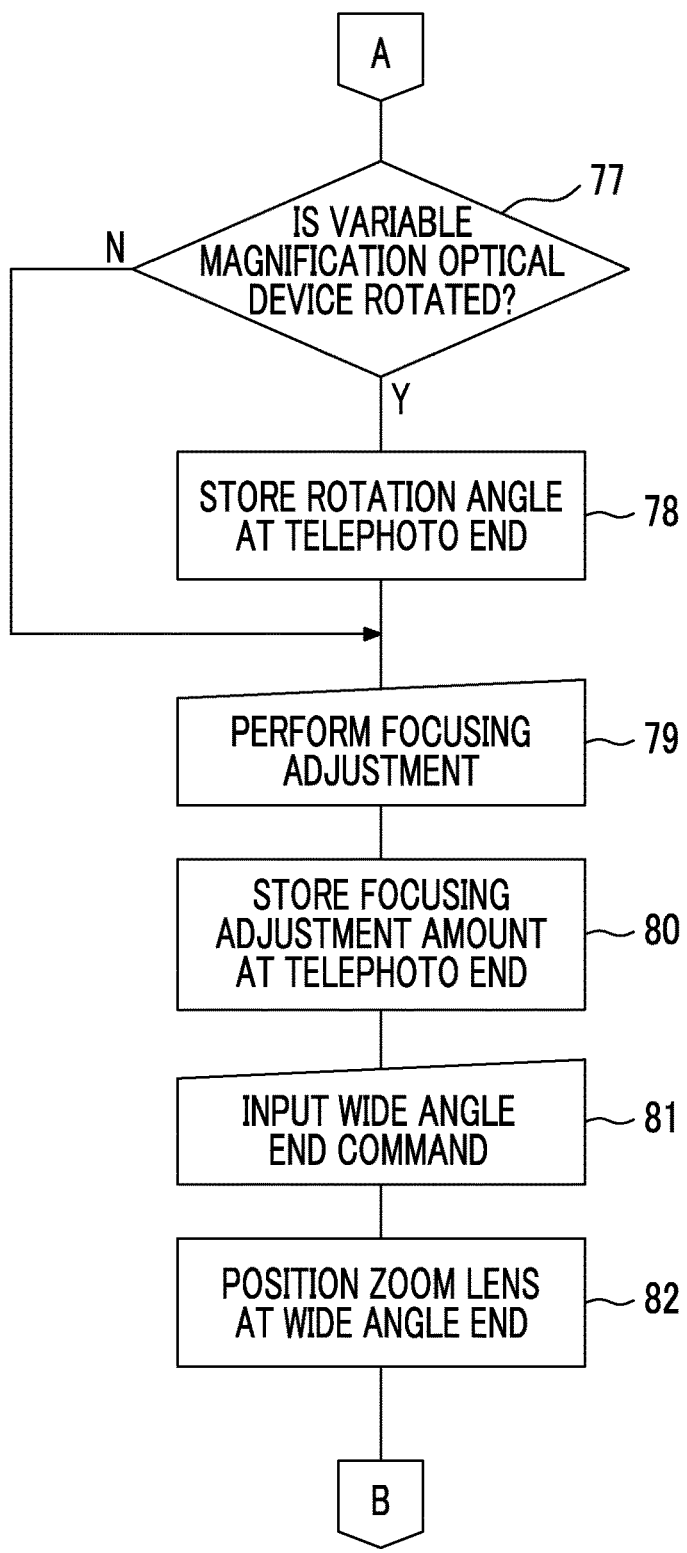
FIG. 11 is a flowchart showing a position adjustment amount storing process procedure.
Figure 12:
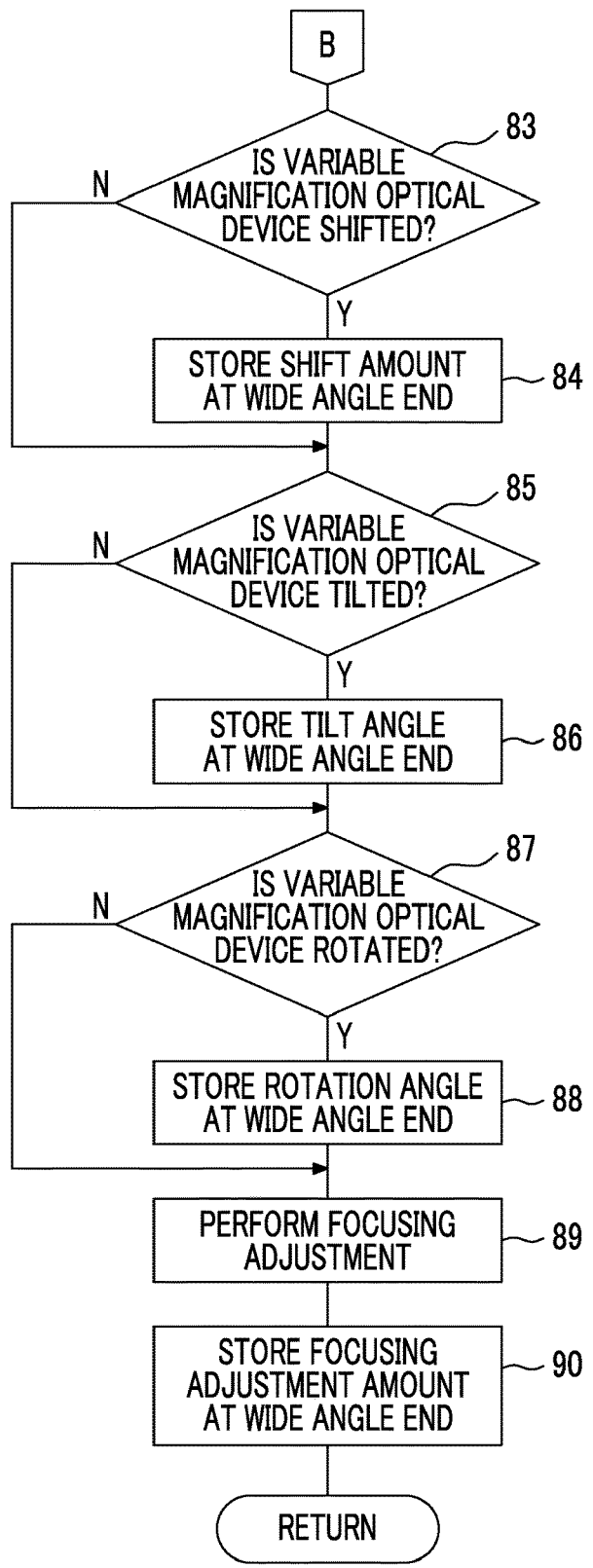
FIG. 12 is a flowchart showing a position adjustment amount storing process procedure.
Figure 14:
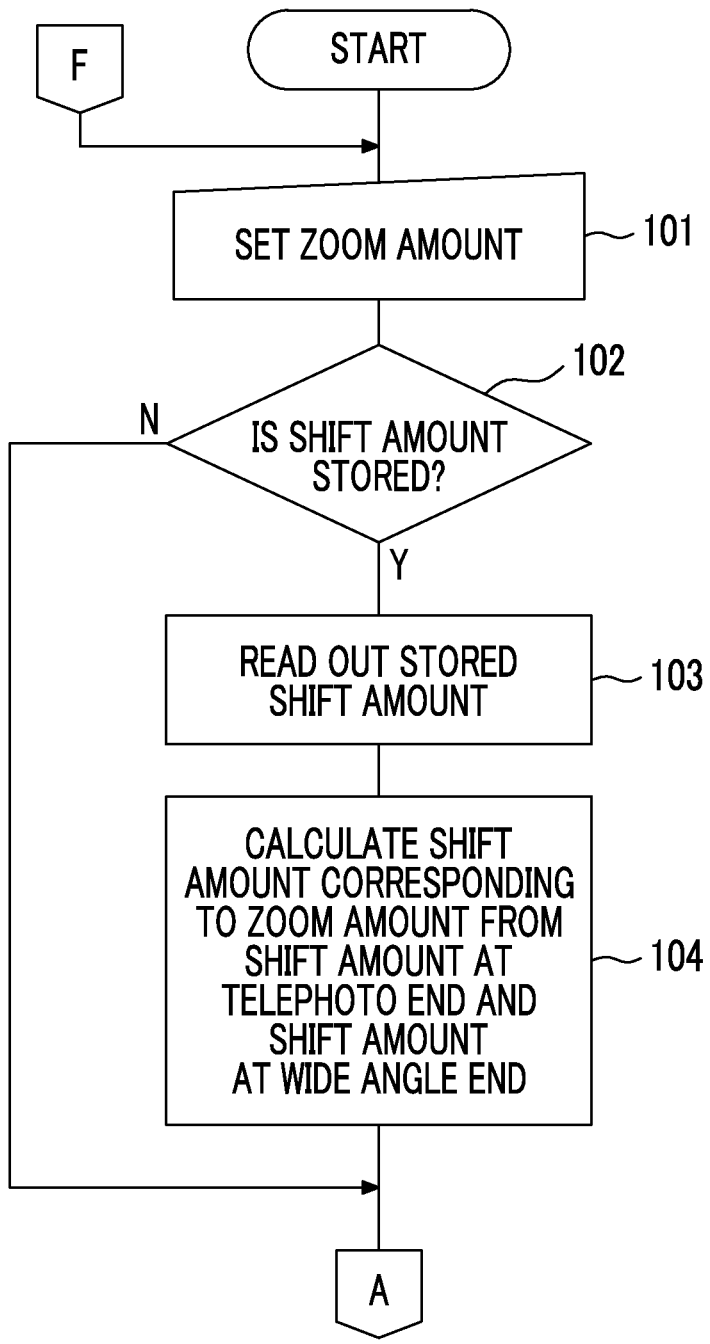
FIG. 14 is a flowchart showing an imaging process procedure.

FIGS. 10 to 12 are flowcharts showing a position adjustment amount storing process procedure.

A position adjustment amount storing process is a process of storing the shift amounts, the tilt angles, and the rotation amounts in a case where the zoom lens 4 is positioned at the telephoto end and the wide angle end, as stated above. For clarity, both the shift direction and the tilt direction are uni-directions, but may be directions other than the uni-directions. In a case where the shift and tilt directions may be directions other than the uni-directions, the shift amounts and the tilt angles are stored so as to correspond to the shift direction and the tilt direction. It is not necessary to store all the shift amounts, the tilt amounts, and the rotation amounts, and at least one amount thereof may be stored in the memory 11 of the variable magnification optical system 1.

In this embodiment, in a case where imaging is performed while using the zoom lens 4 and adjusting the position of the variable magnification optical device 2 such as the shifting thereof, the zoom lens 4 is set at the telephoto end and the wide angle end, and the position adjustment amounts such as the shift amounts at the telephoto end and the wide angle end are stored in advance.

The zoom button 16 is operated by the user, and thus, a telephoto end command is input to the variable magnification optical system 1 (step 71). The zoom lens 4 is driven by the zoom motor 23, and thus, the zoom lens 4 is positioned at the telephoto end (step 72). The subject is captured in a state in which the zoom lens 4 is positioned at the telephoto end, and thus, the subject image is obtained. The subject image is displayed on a display screen (not shown). In a case where the user considers that it is necessary to relatively shift the variable magnification optical device 2 to the imaging device 40, the user sets the shift amount of the variable magnification optical device 2 by operating the shift dial 13 while seeing the subject image (YES in step 73). In response to the setting of the user, the shift mechanism 32 is driven by the shift motor 33, and thus, the variable magnification optical device 2 is relatively shifted to the imaging device 40. The shift amount at the telephoto end set by the user is stored in the memory 11 (step 74).

FIG. 13 shows an example of a position adjustment amount table stored in the memory 11.

In a case where the zoom lens 4 is set at the telephoto end and the shift amount is set to ΔS1, the shift amount at the telephoto end together with ΔS1 is stored in the position adjustment amount table.

Figure 15:
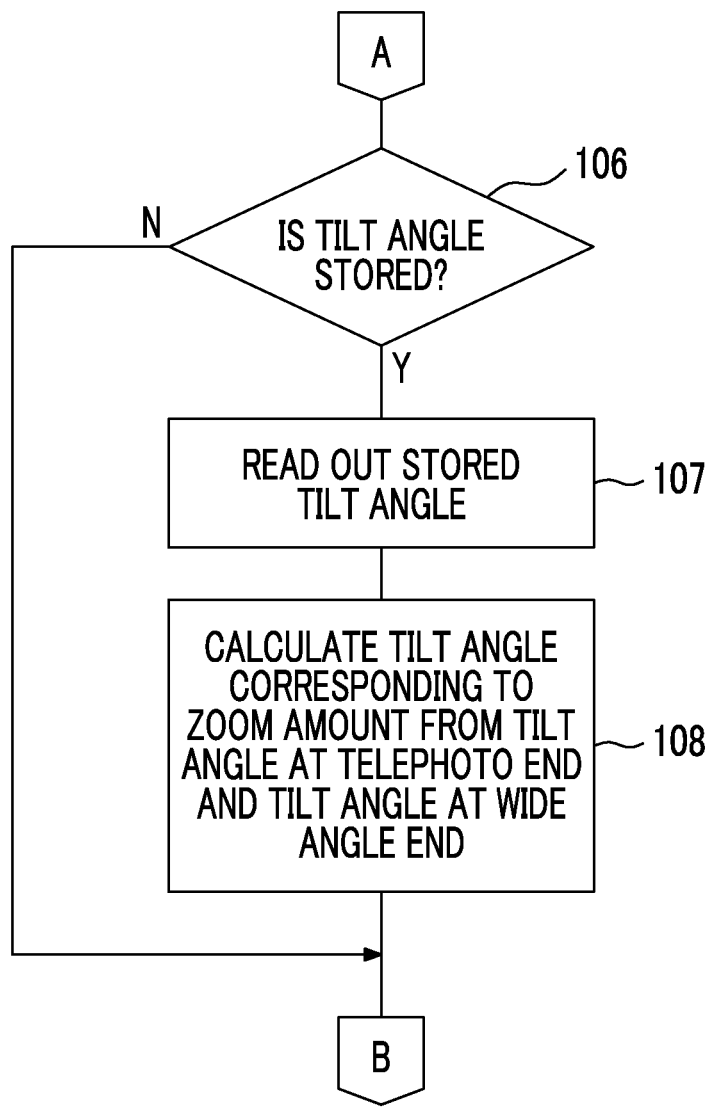
FIG. 15 is a flowchart showing the imaging process procedure.
Figure 16:
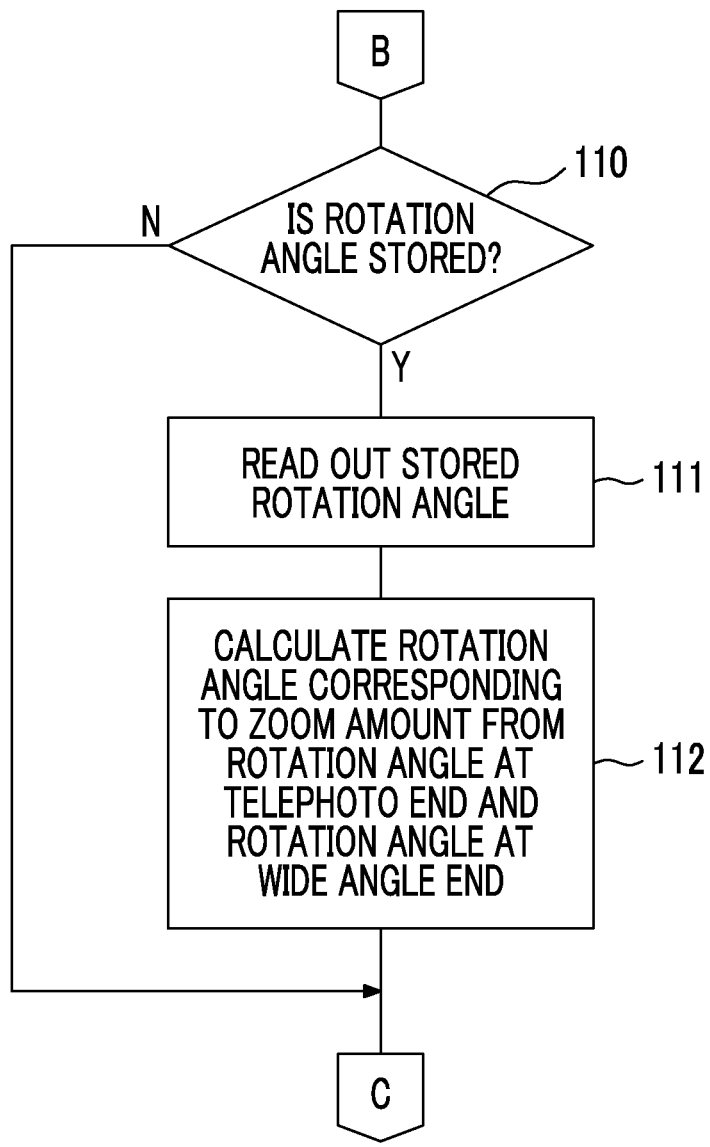
FIG. 16 is a flowchart showing the imaging process procedure.
Figure 17:
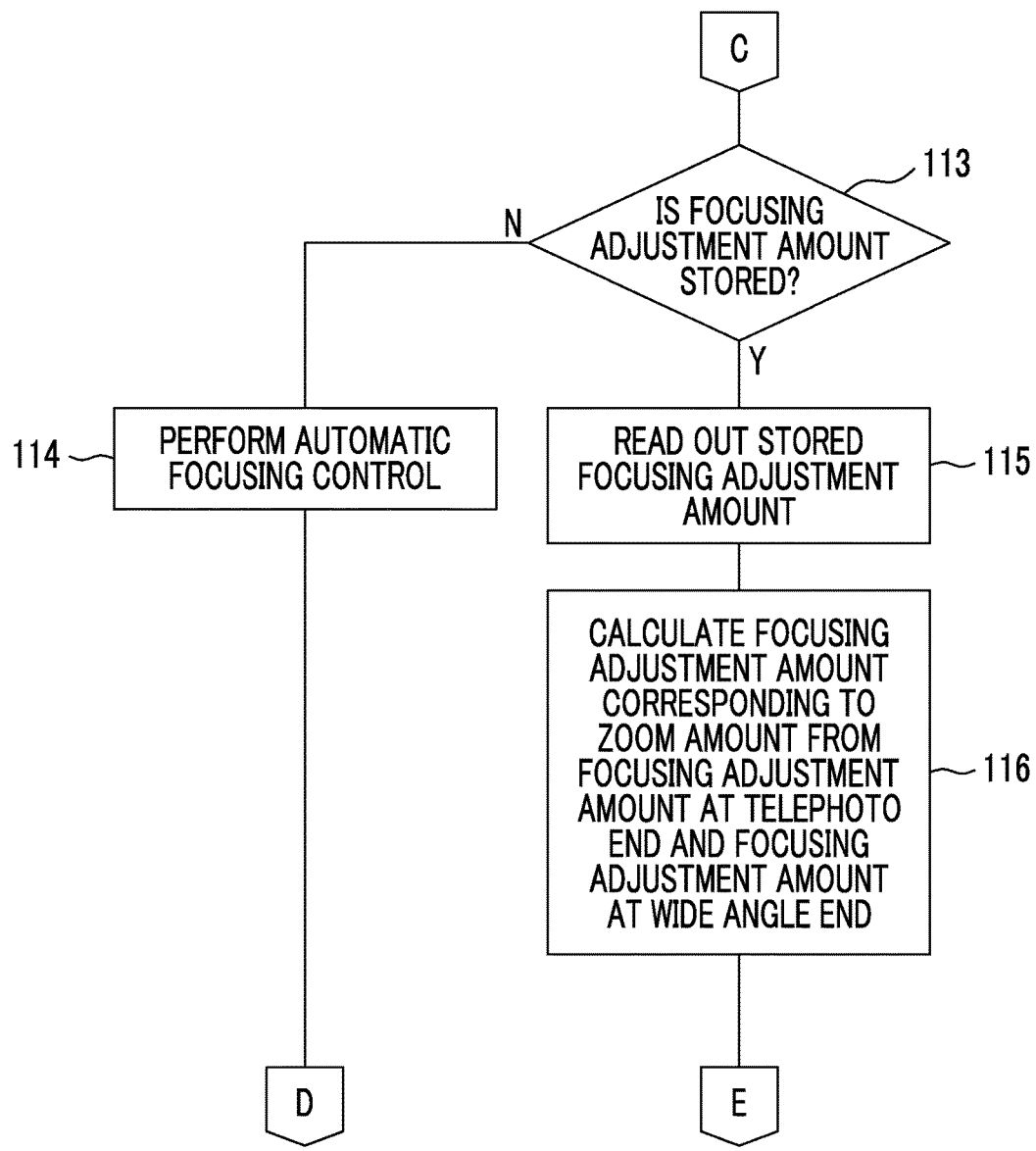
FIG. 17 is a flowchart showing the imaging process procedure.
Figure 18:
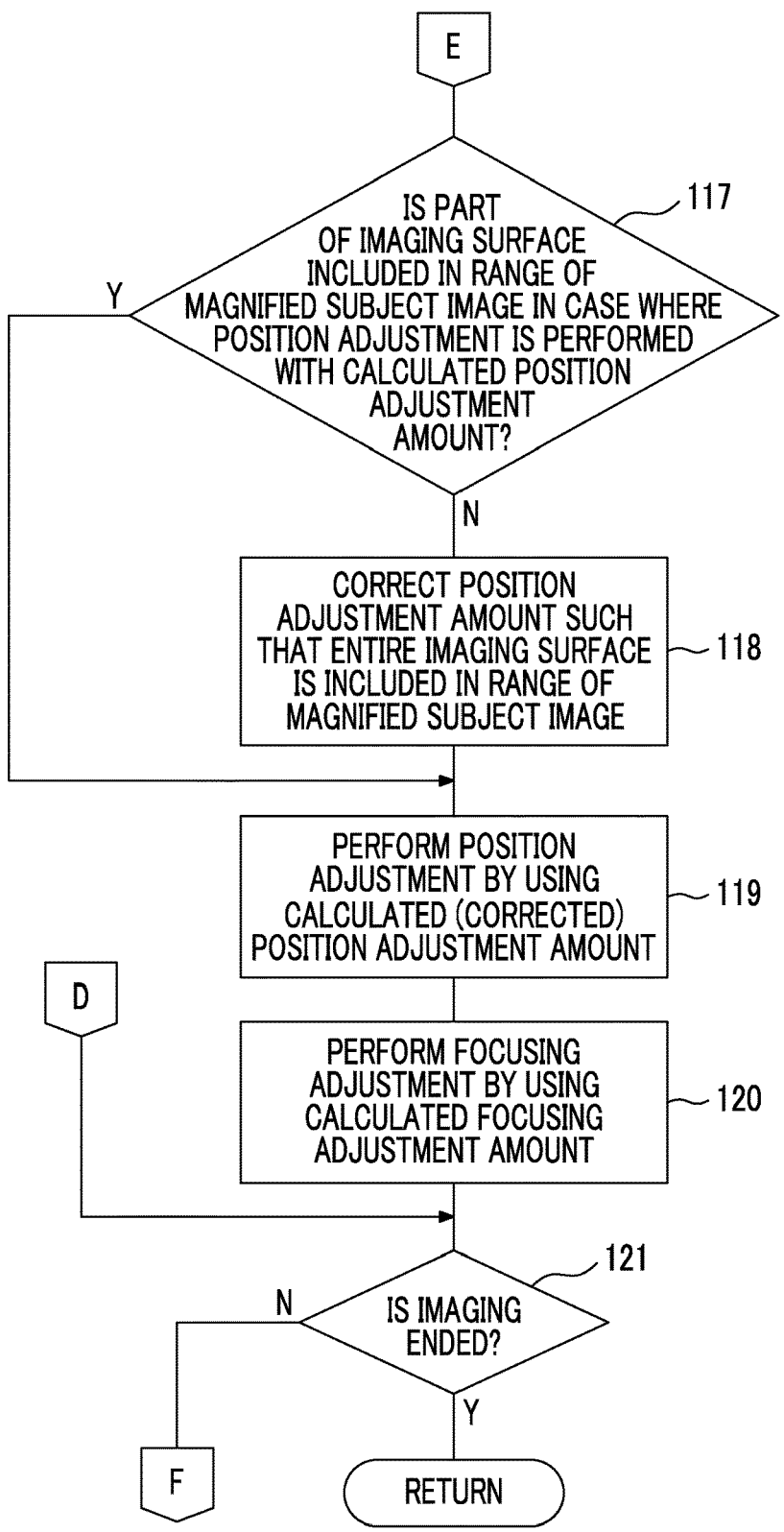
FIG. 18 is a flowchart showing the imaging process procedure.

In a case where the zoom lens 4 is set at the telephoto end and it is considered that it is not necessary to relatively shift the variable magnification optical device 2, the variable magnification optical device 2 is not relatively shifted (NO in step 73). In a case where the zoom lens 4 is set at the telephoto end and the variable magnification optical device 2 is not relatively shifted, there is no data for the shift amount at the telephoto end in the position adjustment amount table shown in FIG. 15.

Subsequently, in a case where the zoom lens 4 is set at the telephoto end and the user considers that it is necessary to relatively tilt the variable magnification optical device 2, the user sets the tilt angle of the variable magnification optical device 2 by operating the tilt dial 12 while seeing the subject image (YES in step 75) (it is assumed that θ1 is set to the tilt angle). In response to the setting of the user, the tilt mechanism 29 is driven by the tilt motor 30. The variable magnification optical device 2 is relatively tilted to the imaging surface 40A of the imaging device 40. The tilt angle θ1 of the variable magnification optical device 2 is stored in the position adjustment amount table stored in the memory 11 (step 76). In a case where the tilt angle is not set by the user (NO in step 75), the tilt angle at the telephoto end is not stored in the memory 11. There is no data for the tilt angle at the telephoto end in the position adjustment amount table shown in FIG. 15.

In a case where the zoom lens 4 is set at the telephoto end and the user considers that it is necessary to relatively rotate the variable magnification optical device 2, the user sets the rotation angle of the variable magnification optical device 2 by operating the rotation dial 14 while seeing the subject image (YES in step 77). The rotation mechanism 35 is driven by the rotation motor 36 in response to the setting of the user. The variable magnification optical device 2 is relatively rotated to the imaging surface 40A of the imaging device 40. A rotation angle $\phi 1$ of the variable magnification optical device 2 is stored in the position adjustment amount table stored in the memory 11 (step 78). In a case where the rotation angle is not set by the user (NO in step 77), the rotation angle at the telephoto end is not stored in the memory 11. There is no data for the rotation angle at the telephoto end in the position adjustment amount table shown in FIG. 15. As described while referring to FIG. 5 or 9, in a case where the variable magnification optical device 2 is relatively shifted such that not the circle 51 but the imaging surface 40A of the imaging device 40 does not protrude from the circle 52 or 53, the imaging surface 40A may protrude from the circle 52 or 53 in a case where the variable magnification optical device 2 is rotated. In a case where the imaging surface 40A of the imaging device 40 protrudes from the circle 52 or 53 by relatively rotating the variable magnification optical device 2, it is preferable that the rotation of the variable magnification optical device 2 is prohibited.

Subsequently, the user adjusts the focusing while seeing the image obtained through the imaging by operating the focusing adjustment amount dial 15 in a state in which the zoom lens 4 is positioned at the telephoto end (step 79). The focusing is adjusted by driving the focus motor 21 or the master motor 27 according to the focusing adjustment amount and moving the focus lens 3 or the master lens 6. The focusing adjustment amount at the telephoto end is stored in the position adjustment amount table shown in FIG. 13, and is stored in the memory 11 (step 80). In a case where the variable magnification optical system 1 has an automatic focusing control function, it is not necessary to store the focusing adjustment amount in the memory 11.

In a case where the shift amount for the telephoto end is stored in the position adjustment amount table, the zoom button 16 is operated by the user, and a wide angle command is input to the variable magnification optical system 1 (step 81). By doing this, the zoom lens 4 is positioned at the wide angle end by the zoom motor 23 (step 82).

The subject is captured in a state in which the zoom lens 4 is positioned at the wide angle end, and thus, the subject image is obtained. The subject image is displayed on a display screen (not shown). In a case where it is considered that it is necessary to relatively shift the variable magnification optical device 2 to the imaging device 40, the user sets the shift amount of the variable magnification optical device 2 by operating the shift dial 13 while seeing the subject image (YES in step 83). In response to the setting of the user, the shift mechanism 32 is driven by the shift motor 33, and thus, the variable magnification optical device 2 is relatively shifted to the imaging device 40. The shift amount at the wide angle end set by the user is stored in the position adjustment amount table, and is stored in the memory 11 (step 84).

In a case where the zoom lens 4 is set at the wide angle end and it is considered that it is not necessary to relatively shift the variable magnification optical device 2, the variable magnification optical device 2 is not relatively shifted (NO in step 83). In a case where the zoom lens 4 is set at the wide angle end and the variable magnification optical device 22 is not relatively shifted, there is no data for the shift amount at the wide angle end in the position adjustment amount table shown in FIG. 13.

Subsequently, in a case where the zoom lens 4 is set at the wide angle end and the user considers that it is necessary to relatively tilt the variable magnification optical device 2, the user sets the tilt angle of the variable magnification optical device 2 by operating the tilt dial 12 while seeing the subject image (YES in step 85). In response to the setting of the user, the tilt mechanism 29 is driven by the tilt motor 30. The variable magnification optical device 2 is relatively tilted to the imaging surface 40A of the imaging device 40. The tilt angle $\theta 1$ of the variable magnification optical device 2 is stored in the position adjustment amount table stored in the memory 11 (step 86). In a case where the tilt angle is not set by the user (NO in step 85), the tilt angle at the wide angle end is not stored in the memory 11. There is no data for the shift angle at the wide angle end in the position adjustment amount table shown in FIG. 13.

In a case where the zoom lens 4 is set at the wide angle end and the user considers that it is necessary to relatively rotate the variable magnification optical device 2, the user sets the rotation angle of the variable magnification optical device 2 by operating the rotation dial 14 while seeing the subject image (YES in step 87). The rotation mechanism 35 is driven by the rotation motor 36 in response to the setting of the user. The variable magnification optical device 2 is relatively rotated to the imaging surface 40A of the imaging device 40. A rotation angle $\phi 2$ of the variable magnification optical device 2 is stored in the position adjustment amount table stored in the memory 11 (step 88). In a case where the rotation angle is not set by the user (NO in step 87), the rotation angle at the wide angle end is not stored in the memory 11. There is no data for the rotation angle at the wide angle end in the position adjustment amount table shown in FIG. 13. Even in a case where the zoom lens 4 is set at the wide angle end, in a case where the variable magnification optical device 2 is relatively shifted such that not the circle 51 but the imaging surface 40A of the imaging device 40 does not protrude from the circle 52 or 53 as described while referring to FIG. 5 or 9, the imaging surface 40A may protrude from the circle 52 or 53 in a case where the variable magnification optical device 2 is rotated. In a case where the imaging surface 40A of the imaging device 40 protrudes from the circle 52 or 53 by relatively rotating the variable magnification optical device 2, it is preferable that the rotation of the variable magnification optical device 2 is prohibited.

Subsequently, the user adjusts the focusing while seeing the image obtained through the imaging by operating the focusing adjustment amount dial 15 in a state in which the zoom lens 4 is positioned at the wide angle end (step 89). The focusing is adjusted by driving the focus motor 21 or the master motor 27 according to the focusing adjustment amount and moving the focus lens 3 or the master lens 6. The focusing adjustment amount at the wide angle end is stored in the position adjustment amount table shown in FIG. 13, and is stored in the memory 11 (step 90). In a case where the variable magnification optical system 1 has the automatic focusing control function, it is not necessary to store the focusing adjustment amount in the memory 11 in a case where the zoom lens 4 is set at the wide angle end, similarly to the case where the zoom lens 4 is set at the telephoto end.

By doing this, as shown in FIG. 13, among the shift amount $\Delta S1$, the tilt angle $\theta 1$, the rotation angle $\phi 1$, and the focusing adjustment amount $\Delta 1$ in a case where the zoom lens 4 is set at the telephoto end and the shift amount $\Delta S2$, the tilt angle $\theta 2$, the rotation angle $\phi 2$, and the focusing adjustment amount $\Delta 2$ in a case where the zoom lens 4 is set at the wide angle end, the value set by the user is stored in the position adjustment amount table, and is stored in the memory 11.

FIGS. 14 to 18 are flowcharts showing a process procedure in a case where the subject is captured using the zoom lens 4 after the position adjustment amount is stored in the memory 11.

The zoom button 16 is operated by the user, and the zoom lens 4 is set to a desired variable magnification amount (step 101). The control circuit 10 determines whether or not both the shift amount at the telephoto end and the shift amount at the wide angle end are stored in the memory 11 (step 102). In a case where both the shift amount at the telephoto end and the shift amount at the wide angle end are stored in the memory 11 (YES in step 102), both the shift amount at the telephoto end and the shift amount at the wide angle end stored in the memory 11 are read out from the memory (step 103). The shift amount corresponding to the zoom amount set by the user is calculated by the control circuit 10 from the readout shift amounts at the telephoto end and the wide angle end (step 104).

Figure 19:
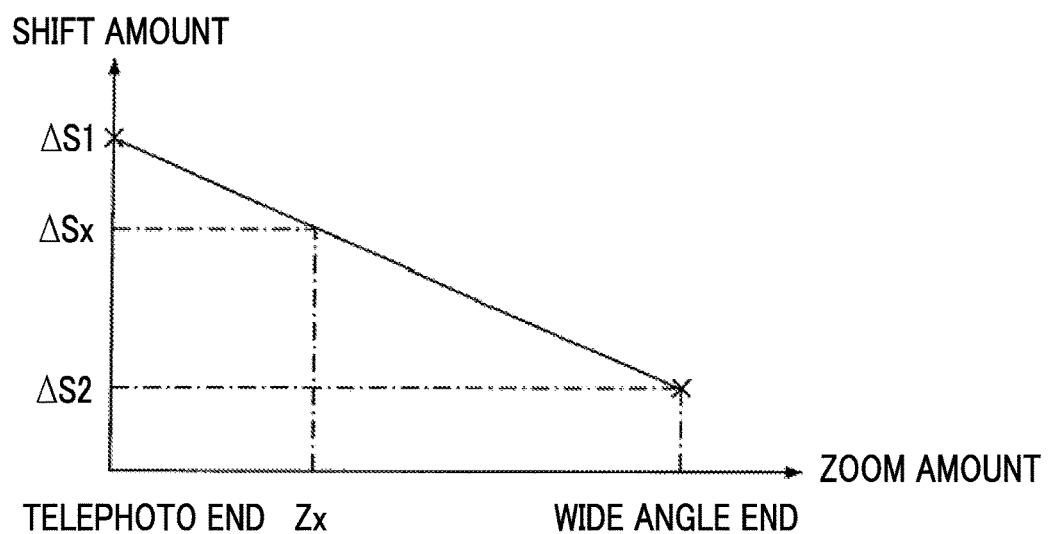
FIG. 19 shows a graph for describing linear interpolation of a shift amount.

FIG. 19 is a graph showing a method of calculating the shift amount corresponding to the zoom amount.

As shown in FIG. 13, it is assumed that the shift amount in a case where the zoom lens 4 is set at the telephoto end is stored as $\Delta S1$ and the shift amount in a case where the zoom lens 4 is set at the wide angle end is stored as $\Delta S2$. The shift amount corresponding to the zoom amount between the zoom amount at the telephoto end and the zoom amount at the wide angle end is calculated through linear interpolation between the shift amount $\Delta S1$ corresponding to the zoom amount at the telephoto end and the shift amount $\Delta S2$ corresponding to the zoom amount at the wide angle end (may be calculated by another method). In a case where the zoom amount is set to Zx, the shift amount $\Delta Sx$ is calculated.

In a case where any of the shift amount at the telephoto end and the shift amount at the wide angle end is not stored in the memory 11 (NO in step 102), it is determined that the user considers that it is not necessary to relatively shift the variable magnification optical device 2, and shift calculation processes of steps 103 and 104 are skipped.

Subsequently, the control circuit 10 determines whether or not any of the tilt angle at the telephoto end and the tilt angle at the wide angle end is stored in the memory 11 (step 106). In a case where any of the tilt angle at the telephoto end and the tilt angle at the wide angle end is stored in the memory 11 (YES in step 106), any of the tilt angle at the telephoto end and the tilt angle at the wide angle end stored in the memory 11 is read out from the memory (step 107). The control circuit 10 calculates the tilt angle corresponding to the zoom amount set by the user from the readout tilt angles at the telephoto end and the wide angle end (step 108).

The tilt angle may also be calculated similarly to the calculation of the shift amount corresponding to the zoom amount described while referring to FIG. 19. For example, it is assumed that the tilt angle in a case where the zoom lens 4 is set at the telephoto end is stored as $\theta 1$ and the tilt angle in a case where the zoom lens 4 is set at the wide angle end is stored as $\theta 2$. The tilt angle corresponding to the zoom amount between the tilt angle $\theta 1$ at the telephoto end and the tilt angle $\theta 2$ at the wide angle end is calculated through linear interpolation between the tilt angle $\theta 1$ corresponding to the zoom amount at the telephoto end and the tilt angle $\theta 2$ corresponding to the zoom amount at the wide angle end (may be calculated by another method).

In a case where any of the tilt angle at the telephoto end and the tilt angle at the wide angle end is not stored in the memory 11 (NO in step 106), it is determined that the user considers that it is not necessary to relatively tilt the variable magnification optical device 2, and shift calculation processes of steps 107 and 108 are skipped.

Subsequently, the control circuit 10 determines whether or not any of the rotation angle at the telephoto end and the rotation angle at the wide angle end are stored in the memory 11 (step 110). In a case where both of the rotation angle at the telephoto end and the rotation angle at the wide angle end are stored in the memory 11 (YES in step 110), both the rotation angle at the telephoto end and the rotation angle at the wide angle end stored in the memory 11 are read out from the memory (step 111). The control circuit 10 calculates the rotation angle corresponding to the zoom amount set by the user from the readout rotation angles at the telephoto end and the wide angle end (step 112).

The rotation angle may be calculated similarly to the calculation of the shift amount corresponding to the zoom amount described while referring to FIG. 19. For example, it is assumed that the rotation angle in a case where the zoom lens 4 is set at the telephoto end is stored as $\phi 1$ and the rotation angle in a case where the zoom lens 4 is set at the wide angle end is stored as $\phi 2$. The rotation angle corresponding to the zoom amount between the rotation angle $\phi 1$ at the telephoto end and the rotation angle $\phi 2$ at the wide angle end is calculated through linear interpolation between the rotation angle $\phi 1$ corresponding to the zoom amount at the telephoto end and the rotation angle $\phi 2$ corresponding to the zoom amount at the wide angle end (may be calculated by another method).

In a case where any of the rotation angle at the telephoto end and the rotation angle at the wide angle end is not stored in the memory 11 (NO in step 110), it is determined that the user considers that it is not necessary to relatively rotate the variable magnification optical device 2, and rotation angle calculation processes of steps 111 and 112 are skipped.

Subsequently, the control circuit 10 determines whether or not both the focusing adjustment amount at the telephoto end and the focusing adjustment amount at the wide angle end are stored in the memory 11 (step 113). In a case where both the focusing adjustment amounts are stored (YES in step 113), both the focusing adjustment amounts of the focusing adjustment amount at the telephoto end and the focusing adjustment amount at the wide angle end stored in the memory 11 are also read out (step 115). The focusing adjustment amount corresponding to the zoom amount set by the user is calculated through linear interpolation between the focusing adjustment amount at the telephoto end and the focusing adjustment amount at the wide angle end (may be calculated by another method) (step 116).

Figure 20:
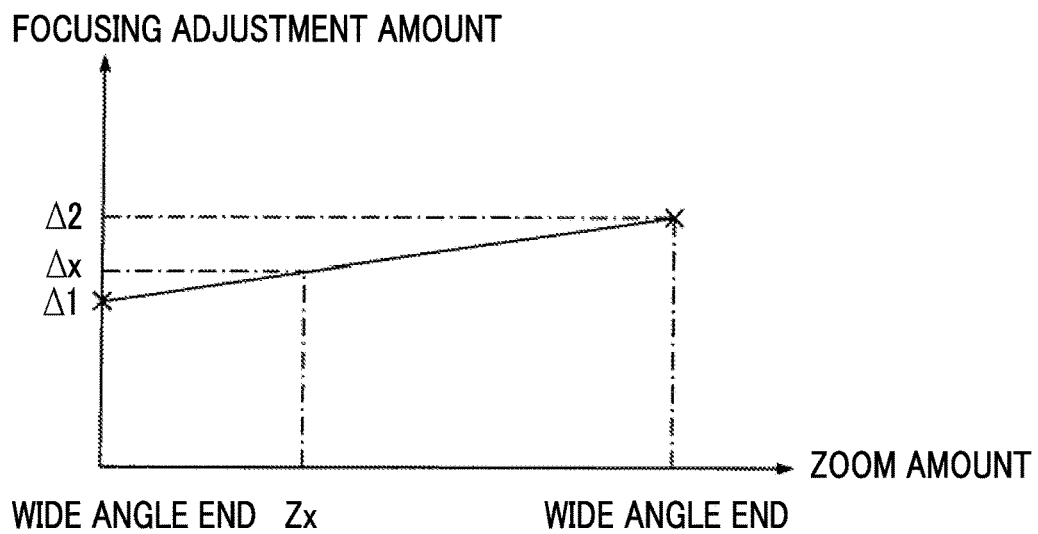
FIG. 20 shows a graph for describing linear interpolation of a focusing adjustment amount.

FIG. 20 is a graph showing a method of calculating the focusing adjustment amount corresponding to the zoom amount.

As shown in FIG. 13, it is assumed that the focusing adjustment amount in a case where the zoom lens 4 is set at the telephoto end is stored as $\Delta 1$ and the focusing adjustment amount in a case where the zoom lens 4 is set as the wide angle end is stored as Δ2. The focusing adjustment amount corresponding to the focusing adjustment amount between the focusing adjustment amount at the telephoto end and the focusing adjustment amount at the wide angle end is calculated through linear interpolation between the focusing adjustment amount Δ1 corresponding to the zoom amount at the telephoto end and the focusing adjustment amount Δ2 corresponding to the zoom amount at the wide angle end (may be calculated by another method). In a case where the zoom amount is set to Zx, the focusing adjustment amount Δx is calculated.

In a case where at least one of the focusing adjustment amount at the telephoto end or the focusing adjustment amount at the wide angle end is not stored in the memory 11 (NO in step 113), the automatic focusing control is performed by using the video signals output from the imaging device 40 (step 114).

Subsequently, in a case where the position of the variable magnification optical device 2 or the imaging device 40 is adjusted by using the position adjustment amount calculated among the position adjustment amounts such as the shift amount, the tilt angle, and the rotation angle corresponding to the zoom amount set by the user, the control circuit 10 determines whether or not at least a part of the imaging surface 40A of the imaging device 40 is not included in the range of the subject image magnified by the magnifying lens 7 (step 117). That is, as described while referring to FIGS. 2 and 9, the control circuit 10 determines whether or not the imaging surface 40A of the imaging device 40 protrudes from the circle 52 or 53 representing the magnified subject image. The control circuit 10 may determine whether or not the circle 51 which is a circumscribed circle of the imaging surface 40A of the imaging device 40 does not protrude from the circle 52 or 53 representing the magnified subject image.

In a case where the position of the variable magnification optical device 2 or the imaging device 40 is adjusted and the at least a part of the imaging surface 40A of the imaging device 40 is not included in the range of the magnified subject image (NO in step 117), the control circuit 10 corrects the position adjustment amount (the shift amount, the tilt angle, or the rotation angle) such that the entire imaging surface 40A of the imaging device 40 is included in the range of the magnified subject image indicated by the circle 52 or 53 (step 118). The position adjustment amount, preferably, the calculated shift amount, tilt angle, or rotation angle among the calculated position adjustment amounts is corrected at the same ratio, and may not be necessarily corrected at the same ratio. Correction priorities of the shift amount, the tilt angle, and the rotation angle may be determined, and these position adjustment amounts may be corrected according to the priorities thereof. In a case where the position of the variable magnification optical device 2 or the imaging device 40 is adjusted and the entire imaging surface 40A of the imaging device 40 is included in the range of the magnified subject image (YES in step 117), a position adjustment amount correction process shown in step 118 is skipped.

In a case where the positional relationship between the variable magnification optical device 2 and the imaging device 40 is adjusted by the position adjustment mechanism by using the position adjustment amount calculated by the control circuit 10 (position adjustment amount calculating unit), the control circuit 10 (determination unit) determines whether or not at least a part of the imaging surface 40A is not included in the range of the magnified subject image by the magnifying lens 7. In a case where the adjustment using the position adjustment mechanism is performed by determining that at least a part of the imaging surface 40A is not included in the range of the subject image magnified by the magnifying lens 7, the control circuit 10 (position adjustment amount correcting unit) corrects the calculated position adjustment amount to a position adjustment amount with which the imaging surface 40A is included in the range of the subject image magnified by the magnifying lens 7.

By doing this, in a case where the position adjustment amount (the position adjustment amount is the shift amount, the tilt angle, or the rotation angle) is calculated or corrected, the position adjustment is performed by using the calculated position adjustment amount or the corrected position adjustment amount (step 119).

The focusing adjustment is performed by using the calculated focusing adjustment amount (step 120). The focusing adjustment may be performed by adjusting the positions of both the lenses of the focus lens 3 and the master lens 6 or may be performed by adjusting the position of any one lens of the focus lens 3 and the master lens 6. In a case where the position adjustment amount is corrected in step 118, since the focusing position is also deviated, the focusing adjustment may be performed or may not be performed by using the calculated focusing adjustment amount. In this case, it is preferred that the calculated focusing adjustment amount is also corrected by using the corrected position adjustment amount and the focusing adjustment is performed by using the corrected focusing adjustment amount. The correction of the focusing adjustment amount may be performed by calculating the zoom amount corresponding to the corrected position adjustment amount and calculating the focusing adjustment amount corresponding to the calculated zoom amount from the corrected position adjustment amount.

The processes from step 101 are repeated until the imaging is ended (step 121).

In a case where the position adjustment amounts (the shift amounts, the tilt angles, or the rotation angles) corresponding to at least two kinds of zoom amounts of the zoom amount at the telephoto end and the zoom amount at the wide angle end are stored and the zoom amount is set by the zoom button 16, the position adjustment amount corresponding to the set zoom amount is calculated by using at least two kinds of stored position adjustment amounts. Since the positional relationship between the variable magnification optical device 2 and the imaging surface 40A of the imaging device 40 is adjusted by using the calculated position adjustment amount and the position adjustment amount corresponding to the set zoom amount is calculated by using the position adjustment amounts corresponding to at least two kinds of zoom amounts, it is possible to calculate a relatively accurate position adjustment amount. It is possible to relatively accurately adjust the positional relationship between the variable magnification optical device 2 and the imaging surface 40A of the imaging device 40 according to the zoom amount.

In the embodiment, the variable magnification optical device 2 forms the subject image on the imaging surface 40A of the imaging device 40 by changing the magnification of the subject image corresponding to the zoom amount (the zoom amount is the variable magnification amount). The zoom button 16 sets the zoom amount of the variable magnification optical device 2. The tilt mechanism 29, the shift mechanism 32, and the rotation mechanism 35 are the position adjustment mechanisms that adjust the positional relationship between the variable magnification optical device 2 and the imaging surface 40A of the imaging device 40 (for example, the positional relationship refers to the positional relationship between the image created by the variable magnification optical device 2 and the imaging surface 40A), and at least one of the tilt mechanism 29, the shift mechanism 32, or the rotation mechanism 35 may be provided. The tilt mechanism tilts the variable magnification optical device 2 such that the optical axis C of the variable magnification optical device 2 is relatively tilted to the central axis of the imaging surface 40A of the imaging device 40. The shift mechanism relatively slides the variable magnification optical device 2 with respect to the imaging surface 40A of the imaging device 40. The rotation mechanism relatively rotates the variable magnification optical device 2 to the imaging surface 40A of the imaging device 40 with the optical axis C of the variable magnification optical device 2 or the central axis of the imaging surface 40A of the imaging device 40 as the center.

The memory 11 is the position adjustment amount memory that stores the position adjustment amounts using the position adjustment mechanism which correspond to the zoom amount at the telephoto end and the zoom amount at the wide angle end (the position adjustment amounts are the shift amounts, the tilt amounts, or the rotation amounts as shown in FIG. 13). The position adjustment amounts corresponding to at least two kinds of zoom amounts may be stored in the memory 11, or the position adjustment amounts corresponding to the zoom amount at the telephoto end and the zoom amount at the wide angle end may not be necessarily stored.

The control circuit 10 is the position adjustment amount calculating unit that calculates the position adjustment amount corresponding to the zoom amount set by the zoom button 16 by using the position adjustment amount stored in the memory 11. The control circuit 10 is the position adjustment mechanism controller that causes the position adjustment mechanism to adjust the positional relationship between the variable magnification optical device 2 and the imaging surface 40A of the imaging device 40 by using the calculated position adjustment amount.

The tilt dial 12, the shift dial 13, and the rotation dial 14 are position adjustment amount input units that input the position adjustment amounts corresponding to at least two kinds of variable magnification amounts. As stated above, in a case where the tilt angle, the shift amount, or the rotation angle (the position adjustment amount) is input from the tilt dial 12, the shift dial 13, or the rotation dial 14, the tilt angle, the shift amount, or the rotation angle (position adjustment amount) input from the tilt dial 12, the shift dial 13, or the rotation dial 14 is stored in the memory 11.

At least one of the focus motor 21 or the master motor 27 is a focusing adjustment mechanism that forms the subject image on the imaging surface 40A of the imaging device 40 by adjusting the focusing adjustment amount, and the memory 11 is a focusing adjustment amount memory that stores the focusing adjustment amounts using the focusing adjustment mechanism which correspond to at least two kinds of zoom amounts. The control circuit 10 is a focusing adjustment amount calculating unit that calculates the focusing adjustment amount corresponding to the set zoom amount by using the focusing adjustment amount stored in the memory 11, and is a focusing adjustment mechanism controller that forms the subject image on the imaging surface 40A by the focusing adjustment mechanism by using the calculated focusing adjustment amount.

The focusing adjustment amount dial 15 is a focusing adjustment amount input unit that inputs the focusing adjustment amounts using the focusing adjustment mechanism which correspond to at least two kinds of zoom amounts, and the memory 11 is the focusing adjustment amount memory that stores the focusing adjustment amount input from the focusing adjustment amount dial 15.

What is claimed is:

1. A variable magnification optical system comprising:
   a variable magnification optical device that forms a subject image on an imaging surface of an imaging device by changing a magnification of the subject image according to a variable magnification amount;
   a variable magnification amount setting device that sets a variable magnification amount of the variable magnification optical device;
   a shift mechanism that relatively slides the variable magnification optical device with respect to the imaging surface;
   a rotation mechanism that relatively rotates the variable magnification optical device around the imaging surface with the optical axis of the variable magnification optical device or the central axis of the imaging surface as a center;
   a position adjustment amount memory that stores position adjustment amounts using the shift mechanism and the rotation mechanism which correspond to at least two kinds of variable magnification amounts;
   a position adjustment amount calculating unit that calculates a position adjustment amount using at least one of the shift mechanism or the rotation mechanism which corresponds to the variable magnification amount set by the variable magnification amount setting device by using the position adjustment amounts stored in the position adjustment amount memory;
   a position adjustment mechanism controller that causes at least one of the shift mechanism or the rotation mechanism to adjust the positional relationship between the variable magnification optical device and the imaging surface by using the position adjustment amount calculated by the position adjustment amount calculating unit;
   a magnifying optical system that magnifies the subject image formed on the imaging surface of the imaging device;
   a determination unit that determines whether or not at least a part of the imaging surface is not included in a range of the subject image magnified by the magnifying optical system in a case where the positional relationship between the variable magnification optical device and the imaging surface is adjusted by at least one of the shift mechanism or the rotation mechanism by using the position adjustment amount calculated by the position adjustment amount calculating unit; and
   a position adjustment amount correcting unit that corrects the position adjustment amount calculated by the position adjustment amount calculating unit to a position adjustment amount with which the circumscribed circle of the imaging surface is included in the range of the subject image magnified by the magnifying optical system in a case where adjustment using at least one of the shift mechanism or the rotation mechanism is performed according to the fact that the determination unit determines that the at least a part of the imaging surface is not included in the range of the subject image magnified by the magnifying optical system.

2. The variable magnification optical system according to claim 1, further comprising:
   a position adjustment amount input unit that inputs the position adjustment amounts using the position adjustment mechanism which correspond to the at least two kinds of variable magnification amounts, wherein the position adjustment amount memory stores the position adjustment amounts input from the position adjustment amount input unit.

3. The variable magnification optical system according to claim 1, further comprising:

a focusing adjustment mechanism that forms the subject image on the imaging surface by adjusting a focusing adjustment amount;

a focusing adjustment amount memory that stores focusing adjustment amounts using the focusing adjustment mechanism which correspond to the at least two kinds of variable magnification amounts;

a focusing adjustment amount calculating unit that calculates the focusing adjustment amount using the focusing adjustment mechanism which corresponds to the variable magnification amount set by the variable magnification amount setting device by using the focusing adjustment amounts stored in the focusing adjustment amount memory; and a focusing adjustment mechanism controller that forms the subject image on the imaging surface by the focusing adjustment mechanism by using the focusing adjustment amount calculated by the focusing adjustment amount calculating unit.

4. The variable magnification optical system according to claim 3, wherein the variable magnification optical device includes at least one optical system of a focusing optical system or a master optical system, and the focusing adjustment mechanism forms the subject image on the imaging surface by adjusting the at least one optical system of the focusing optical system or the master optical system.

5. The variable magnification optical system according to claim 1, wherein the at least two kinds of variable magnification amounts are a variable magnification amount at a telephoto end and a variable magnification amount at a wide angle end.

6. The variable magnification optical system according to claim 1, wherein the position adjustment amount calculating unit calculates the position adjustment amount using the position adjustment mechanism which corresponds to the variable magnification amount set by the variable magnification amount setting device by performing linear interpolation on the position adjustment amounts using the position adjustment mechanism which correspond to the at least two kinds of variable magnification amounts stored in the position adjustment amount memory.

7. The variable magnification optical system according to claim 3, wherein the focusing adjustment amount calculating unit calculates the focusing adjustment amount using the focusing adjustment mechanism which corresponds to the variable magnification amount set by the variable magnification amount setting device by performing linear interpolation on the focusing adjustment amounts using the focusing adjustment mechanism which correspond to the at least two kinds of variable magnification amounts stored in the focusing adjustment amount memory.

8. The variable magnification optical system according to claim 3, further comprising:

a focusing adjustment amount input unit that inputs the focusing adjustment amounts using the focusing adjustment mechanism which correspond to the at least two kinds of variable magnification amounts, wherein the focusing adjustment amount memory stores the focusing adjustment amounts input from the focusing adjustment amount input unit.

9. The variable magnification optical system according to claim 1, wherein the imaging device is provided on a camera main body, and at least one of the variable magnification amount setting device, the position adjustment mechanism, the position adjustment amount memory, the position adjustment amount calculating unit, or the position adjustment mechanism controller is further provided on the camera main body.

10. A control method of a variable magnification optical system, the method comprising:

causing a variable magnification optical device to form a subject image on an imaging surface of an imaging device by changing a magnification of the subject image according to a variable magnification amount;

causing a variable magnification amount setting device to set a variable magnification amount of the variable magnification optical device;

causing a shift mechanism to relatively slides the variable magnification optical device with respect to the imaging surface;

causing a rotation mechanism to relatively rotates the variable magnification optical device around the imaging surface with the optical axis of the variable magnification optical device or the central axis of the imaging surface as a center;

causing a position adjustment amount memory to stores position adjustment amounts using the shift mechanism and the rotation mechanism which correspond to at least two kinds of variable magnification amounts;

causing a position adjustment amount calculating unit to calculates a position adjustment amount using at least one of the shift mechanism or the rotation mechanism which corresponds to the variable magnification amount set by the variable magnification amount setting device by using the position adjustment amounts stored in the position adjustment amount memory;

causing a position adjustment mechanism controller to causes at least one of the shift mechanism or the rotation mechanism to adjust the positional relationship between the variable magnification optical device and the imaging surface by using the position adjustment amount calculated by the position adjustment amount calculating unit;

causing a magnifying optical system to magnifies the subject image formed on the imaging surface of the imaging device;

causing a determination unit to determines whether or not at least a part of the imaging surface is not included in a range of the subject image magnified by the magnifying optical system in a case where the positional relationship between the variable magnification optical device and the imaging surface is adjusted by at least one of the shift mechanism or the rotation mechanism by using the position adjustment amount calculated by the position adjustment amount calculating unit; and causing a position adjustment amount correcting unit to corrects the position adjustment amount calculated by the position adjustment amount calculating unit to a position adjustment amount with which the circumscribed circle of the imaging surface is included in the range of the subject image magnified by the magnifying optical system in a case where adjustment using at least one of the shift mechanism or the rotation mechanism is performed according to the fact that the determination unit determines that the at least a part of the imaging surface is not included in the range of the subject image magnified by the magnifying optical system.

* * * * *